(12) United States Patent
Samosky et al.

(10) Patent No.: US 10,417,936 B2
(45) Date of Patent: *Sep. 17, 2019

(54) HYBRID PHYSICAL-VIRTUAL REALITY SIMULATION FOR CLINICAL TRAINING CAPABLE OF PROVIDING FEEDBACK TO A PHYSICAL ANATOMIC MODEL

(71) Applicant: University of Pittsburgh—Of the Commonwealth System of Higher Education, Pittsburgh, PA (US)

(72) Inventors: Joseph T. Samosky, Pittsburgh, PA (US); Robert Weaver, Pittsburgh, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,971

(22) Filed: Mar. 21, 2016

(65) Prior Publication Data

US 2016/0203737 A1    Jul. 14, 2016

Related U.S. Application Data

(63) Continuation of application No. 13/980,500, filed on Aug. 15, 2013, now Pat. No. 9,318,032.
(Continued)

(51) Int. Cl.
*G09B 23/28*     (2006.01)
*G09B 23/30*     (2006.01)
(Continued)

(52) U.S. Cl.
CPC .............. *G09B 23/28* (2013.01); *G09B 9/00* (2013.01); *G09B 23/285* (2013.01); *G09B 23/30* (2013.01); *G09B 23/32* (2013.01); *B33Y 80/00* (2014.12)

(58) Field of Classification Search
CPC ........... G09B 23/28; G09B 23/30; G09B 9/00
(Continued)

(56) References Cited

U.S. PATENT DOCUMENTS 5,766,016 A * 6/1998 Sinclair ................. G09B 23/28
                                                    434/262
5,769,640 A   6/1998 Jacobus et al.
(Continued)

FOREIGN PATENT DOCUMENTS

KR      10-1092372 B1    12/2011

OTHER PUBLICATIONS

Jung Suk Jang, International Search Report and Written Opinion of the International Searching Authority, or the Declaration, dated Sep. 12, 2012, 13 pages.

*Primary Examiner* — Jerry-Daryl Fletcher
(74) *Attorney, Agent, or Firm* — Eckert Seamans Cherin & Mellott, LLC

(57) ABSTRACT

Systems and methods facilitating training in clinical procedures via mixed reality simulations are disclosed. Such a system can comprise a physical model and a virtual model of an anatomic region associated with the procedure, wherein the virtual model associates tissue types with locations in the physical model. The system can include a tracking component that tracks locations of at least one clinical instrument relative to the models, and an anatomic feedback component that can produce perceptible changes in the physical model based on the interaction between the instrument and virtual model. A clinical device interface can detect outputs of clinical devices like electrical signals, pressure or flow, wherein feedback to the physical model depends on the tracked position of a clinical device and output from the same or different clinical device. Another component can generate feedback effects to the clinical
(Continued)

device. Aspects can simulate anesthesiology procedures like local nerve blockade.

20 Claims, 16 Drawing Sheets

Related U.S. Application Data

(60) Provisional application No. 61/439,505, filed on Feb. 4, 2011.

(51) Int. Cl.
*G09B 9/00* (2006.01)
*G09B 23/32* (2006.01)
*B33Y 80/00* (2015.01)

(58) Field of Classification Search
USPC .......................................... 434/262
See application file for complete search history.

(56) References Cited

U.S. PATENT DOCUMENTS

| | | | |
|---|---|---|---|
| 6,002,518 A * | 12/1999 | Faris | G02B 27/0093 345/32 |
| 6,527,558 B1 | 3/2003 | Eggert et al. | |
| 2002/0150626 A1 | 10/2002 | Kohane et al. | |
| 2003/0031993 A1 | 2/2003 | Pugh | |
| 2003/0167021 A1 | 9/2003 | Shimm | |
| 2004/0009459 A1* | 1/2004 | Anderson | G06F 19/3406 434/262 |
| 2005/0032028 A1 | 2/2005 | Chosack et al. | |
| 2006/0204939 A1* | 9/2006 | Bardsley | G09B 23/285 434/262 |
| 2007/0156451 A1* | 7/2007 | Gering | G06Q 50/22 705/2 |
| 2007/0168339 A1* | 7/2007 | Vezina | G09B 7/00 |
| 2010/0099067 A1* | 4/2010 | Agro' | G09B 23/34 434/272 |
| 2010/0111390 A1* | 5/2010 | Fenchel | G06K 9/6292 382/131 |
| 2010/0159434 A1 | 6/2010 | Lampotang et al. | |
| 2010/0167253 A1* | 7/2010 | Ryan | G09B 23/30 434/272 |
| 2011/0026786 A1* | 2/2011 | Mohamed | G06F 19/321 382/128 |
| 2012/0116221 A1* | 5/2012 | Sehgal | A61N 7/00 600/439 |
| 2016/0133056 A1* | 5/2016 | Lampotang | G09B 23/285 345/419 |

* cited by examiner

HYBRID PHYSICAL-VIRTUAL REALITY SIMULATION FOR CLINICAL TRAINING CAPABLE OF PROVIDING FEEDBACK TO A PHYSICAL ANATOMIC MODEL

CROSS-REFERENCE TO RELATED APPLICATIONS

This application is a continuation of and claims priority to co-pending U.S. patent application Ser. No. 13/980,500 entitled "Hybrid Physical-Virtual Reality Simulation for Clinical Training Capable of Providing Feedback to a Physical Anatomic Model" filed Aug. 5, 2013, which claims the benefit of U.S. Provisional Patent application Ser. No. 61/439,505 entitled "A Hybrid Physical-Virtual Reality Simulation System to Enhance Training of Peripheral Anesthesia with Ultrasound and Neurostimulator Guidance" and filed Feb. 4, 2011. The entireties of the above-noted applications are incorporated by reference herein.

TECHNICAL FIELD

The general field of this innovation is simulation-based training (SBT) for medical procedures.

BACKGROUND

Simulation-based training (SBT) has had a major positive impact on safety and operational costs in high-risk industries including aviation, aerospace and the military, and is now being applied to achieve similar benefits in healthcare. SBT is undergoing exponential growth in healthcare as the medical community recognizes its many demonstrated benefits: safe rehearsal of procedures without risk exposure to patients, the ability to provide standardized training and objective assessment, and the ultimate positive effect on patient safety, efficacy of care and reduction of risk exposure.

One example of a potential procedure that can benefit dramatically from SBT is peripheral nerve blockade. Interest in peripheral nerve blockade has increased dramatically in the past decade as it has been recognized that the procedure offers significant benefits in orthopedics and other applications. However, nerve blockade is also potentially harmful. Central nervous system and cardiovascular toxicity, including refractory cardiac arrest, are possible, albeit rare, complications of peripheral nerve blockade. Nerve injury, while usually temporary, is much more common, and studies have estimated its occurrence in 0.3% to 3% of peripheral blocks.

A variety of approaches have been pursued to simulate the multiple and varied aspects of peripheral nerve block procedures, including physical models, models with embedded conductive "nerves," computer-simulated ultrasound, virtual reality (VR) systems with commercial haptic interfaces, and haptic devices to simulate needle force profiles during insertion. A fundamental design decision for simulation systems is the choice of physical or virtual models. Each type of simulation has merits and limitations for perceptual display and interaction.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that facilitates training in clinical procedures via mixed reality simulations are disclosed. Such a system can comprise a physical model of an anatomic region that can be associated with the clinical procedure and a virtual model of the anatomic region, wherein the virtual model that can associate a tissue type with each location in the physical model. The system can also include a tracking component that can track at least one location of at least one clinical instrument relative to the physical model and the virtual model, and a feedback component that can provide feedback based at least in part on at least one location in the physical model associated with the at least one location of the at least one clinical instrument.

In another aspect of the subject innovation, it can comprise a method of facilitating clinical training. The method can include the acts of constructing a physical model of an anatomical region constructing a virtual model of the anatomical region, wherein the virtual model is isomorphic to the physical model. The method can also include the step of associating the physical model with the virtual model, wherein a tissue type of the virtual model can be associated with each of a plurality of locations of the physical model. Additionally, the method can include the acts of tracking the locations of one or more clinical instruments relative to the physical model and providing feedback based at least in part on the location of the one or more clinical instruments and the tissue type associated with a corresponding location in the physical model.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
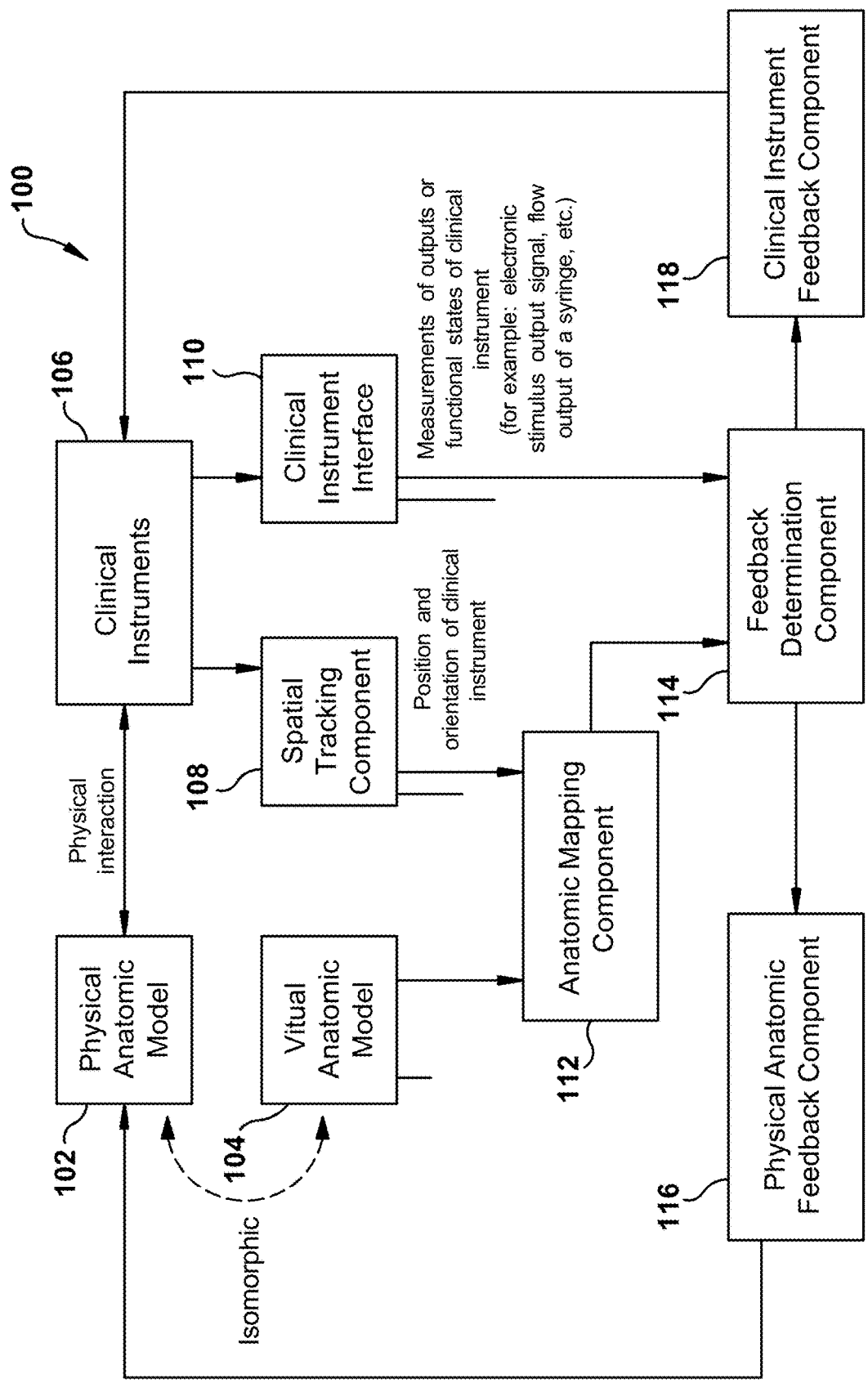
FIG. 1 illustrates a system that can simulate a clinical procedure via a hybrid physical-virtual model.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

The subject innovation relates generally to simulation based training (SBT), and in aspects, the innovation can simulate a clinical procedure utilizing a mixed-reality approach that can incorporate one or more of a physical model, a virtual model (e.g., which can be a 3D model derived from a medical imaging scan (e.g. magnetic resonance imaging (MRI), computed tomography (CT) data, or 3D ultrasound data, etc.) isomorphic to the physical model, etc.), mechatronics and spatial tracking.

In various aspects, the subject innovation can use tangible (e.g., physical) interfaces to simulate surface anatomy, haptic feedback in response to instruments (e.g., during needle insertion, etc.), mechatronic feedback (e.g., display of muscle twitch corresponding to the specific nerve stimulated, etc.), and visual and haptic feedback (e.g., for an injection syringe, etc.). In aspects, feedback response can be calculated incorporating the sensed output of real clinical instruments or devices (e.g., neurostimulator, etc.). The virtual model can be isomorphic with the physical model and can be derived from segmented medical imaging scan data (MRI, CT, 3D ultrasound (US), etc.). In various embodiments, the model can provide the subsurface anatomy of a region, and, combined with tracking of one or more clinical instruments or devices, can support simulated ultrasound display and measurement of instrument location and proximity to a goal (e.g., target nerve, etc.). The innovation also supports objective performance metrics of clinical technique.

Systems and methods employing such a simulation can have any of a plurality of aspects not available in conventional systems. For example, a change in the physical model can be created based on interaction with the virtual model. This can occur via the physical model and the virtual being co-registered or associated with each other such that interactions of clinical instruments or devices with one or both of the models can provide feedback in the physical model based on the virtual model (e.g., providing varying liquids on plunger pull-back based on a tissue type of the virtual model associated with the location of a needle tip in the physical model), or interaction with one location of the physical model can, via association with the virtual model, create feedback such as actuation at another location of the physical model (e.g., simulated twitch in response to a neurostimulator, etc.) or at another tool or instrument (e.g., variable resistance or fluid at a plunger based on the location of a needle tip, etc.). As another example, a physical model and an isomorphic virtual model (which can be a 3-dimensional (3D) spatial model) can be created based on a common source of real anatomical information, such as a magnetic resonance imaging (MRI) scan (or CT, or 3D ultrasound, etc.).

The subject innovation relates generally to simulation-based training (SBT) for medical procedures. In various embodiments, the innovation can include systems useable to improve training of one or more clinical procedure (e.g., nerve blockades such as peripheral or axillary nerve blocks, as described further herein, or other procedures, etc.). One example procedure that embodiments of the subject innovation could be used in connection with is peripheral nerve blockade.

In various aspects, the subject innovation can include simulation of various clinical procedures via a mixed-reality (hybrid physical-virtual) model. For example, of peripheral nerve block that can utilize a mixed-reality approach in accordance with aspects of the subject innovation. In various embodiments, such a simulator can utilize a physical model, a virtual model (e.g., MRI-derived, CT-derived, 3D ultrasound (US)-derived, etc.), mechatronics and spatial tracking. Various embodiments can use one or more of tangible (physical) interfaces to simulate surface anatomy, haptic feedback during needle insertion, mechatronic display of muscle twitch corresponding to the specific nerve stimulated, and visual and haptic feedback for the injection syringe. The twitch response can be calculated incorporating the sensed output of a real neurostimulator. The virtual model can be isomorphic with the physical model and can be derived from segmented MRI (CT, 3D US, etc.) data. Such a model can provide the subsurface anatomy and, combined with electromagnetic tracking of a sham (or simulated) ultrasound probe and a standard nerve block needle, can support simulated ultrasound display and measurement of needle location and proximity to nerves and vessels. The needle tracking and virtual model can also support objective performance metrics of needle targeting technique. Other embodiments can provide similar modeling, interactivity, and feedback associated with alternative clinical procedures.

A variety of approaches can be used to simulate the multiple and varied aspects of procedures (e.g., peripheral nerve block procedures, etc.), including physical models, models with embedded conductive nerves, computer-simulated ultrasound, virtual reality (VR) systems with commercial haptic (touch or force-feedback) interfaces, and novel haptic devices to simulate needle force profiles during insertion. A fundamental design decision for simulation systems is the choice of physical or virtual models. Both physical and virtual systems have merits and limitations for perceptual display and interaction. In aspects, systems and methods of the subject innovation can utilize a hybrid physical-VR approach that enables emulation of the salient aspects of one or more clinical procedures, such as peripheral anesthesia and other needle-targeting medical procedures, etc.

Systems and methods described herein can provide a comprehensive simulator for multiple aspects of various procedural techniques (e.g., nerve block techniques, etc.). In the context of nerve blocks, these can include both traditional neurostimulator-guided blocks and newer ultrasound-guided techniques. In various aspects, the subject innovation can include a unique approach that combines both real (physical) and virtual models. These models interact with one another and allow accurate, extensible and comprehensive simulation of all salient aspects of the procedure (e.g, nerve block, etc.).

As described herein, the techniques, systems and methods described herein are applicable to training a wide variety of other medical procedures beyond those described in detail herein (e.g., nerve blockade, etc.), including needle biopsy (such as of the breast, liver, etc.), lumbar puncture, brachytherapy (radioactive seed placement) (e.g., for prostate cancer, etc.), as well as other procedures.

Turning to the figures, FIG. 1 illustrates a system 100 that can simulate a clinical procedure via a hybrid physical-virtual model. The system can include a physical anatomic model 102 and a virtual anatomic model 104 that can be isomorphic to one another. The physical anatomic model 102 and the virtual anatomic model 104 can model an anatomic region associated with the clinical procedure (e.g., limb, neck, back, or substantially any other anatomic region). In aspects, the physical anatomic model 102 a highly accurate physical anatomic model fitted with robotic actuators, as described herein, or a relatively more simple model, etc. that can model the anatomic location or region associated with the clinical training, while the virtual anatomic model 104 can provide detailed internal anatomic structural data, such as by associating a tissue type with each location in the physical anatomic model 102. In aspects, the physical anatomic model 102 and the virtual anatomic model 104 can be created based at least in part on detailed anatomic data relating to the anatomic region, for example, a 3D magnetic resonance imaging (MRI) scan (or CT, US, etc.) of the corresponding anatomic region of a volunteer. In such aspects, data relating to tissue types, locations, etc. can be segmented from the MRI, etc. scan and used to construct the physical anatomic model 102 and the virtual anatomic model 104. Material selection of the physical anatomic model 102 can be based at least in part to simulate the tissue types of the corresponding anatomic region of the volunteer, for example, to convey a realistic appearance, texture, haptic feedback (e.g., resistance to clinical instruments or devices, etc.), etc. The two anatomic models can be co-registered such that the virtual anatomic model 104 can associate tissue types with corresponding locations of the physical anatomic model 102. In various aspects, as described further herein, virtual anatomic model 104 can correspond to real anatomy (e.g., as derived from segmented medical imaging data, from any of a plurality of persons, etc.), or can correspond to modifications or simplifications thereof (e.g., for training purposes, etc.).

In any of a variety of embodiments, these different virtual anatomic models 104 may be used with the same physical anatomic model 102 at different times (e.g., by changing as a user develops proficiency from one use of system 100 to the next, by varying the person from whom the virtual anatomic model 104 is derived so as to provide a range of simulations of a single procedure, etc.). Depending on the specific embodiment, and potentially on the use for which the system is to be employed (e.g., training procedures in situations analogous to real-world situations, etc.), the details of both the physical anatomic model 102 and the virtual anatomic model 104 will vary. For example, in the experiments and prototypes discussed herein, the physical model 102 can be a tangible model of an anatomical site associated with one or more clinical procedures, such as the cylindrical limb phantom or mechatronic limb (or other anatomic region, etc.) discussed in greater detail herein (or other appropriate regions, depending upon the associated procedure(s), etc.). The virtual anatomic model 104 can be a 3D model and can virtually represent the anatomical region corresponding to the physical anatomic model 102, and can comprise information associating or co-registering anatomical features or tissue types (e.g., blood vessels, nerves, etc.) with locations in the physical anatomic model 102. As explained herein, details for one or more of the physical anatomic model 102 or virtual anatomic model 104 can be based on detailed anatomical data, such as a high resolution 3D magnetic resonance imaging (MRI) scan (or CT, US, etc.) of the anatomical region (e.g., arm and brachial plexus for the peripheral nerve block prototypes and experiments discussed below, etc.), segmentation of one or more of skin, blood vessels, fascia, nerves, etc. (e.g., the median, ulnar, radial and musculocutaneous nerves in the arm and brachial plexus example, etc.) from the MRI (etc.) data, and incorporating these 3D virtual structural component models into the simulator. In various aspects, the design of physical anatomic model 102, such as the selection of materials, etc., can be chosen so as to closely approximate the actual procedure being simulated, such as modeling fascial interfaces to provide the sensation of a "pop" as the needle advances through a fascial layer, etc.

As a user (e.g., student, trainee, expert, etc.) interacts with system 100 to simulate the clinical procedure, the user can utilize one or more clinical instruments, tools, devices, other implements, etc. 106 to interact with the physical anatomic model 102 (as used herein, these terms—clinical instruments or instruments, etc.—are intended to include any tools or devices used in clinical procedures, whether purely mechanical, electronic, etc.). As the user manipulates the clinical instruments 106, a spatial tracking component 108 can monitor a position and/or orientation (e.g., utilizing a 3D spatial tracking system) of each of a first subset of the one or more clinical instruments 106 (e.g., needle tip, sham ultrasound probe, etc.) and map those positions to the corresponding anatomic positions in the virtual model (e.g., in a nerve block embodiment, it can track a block needle and ultrasound probe and can be optionally used with algorithms to quantify needle and probe targeting accuracy and trajectories, etc.). Additionally, a clinical instrument interface 110 can monitor measurements of outputs or functional states of each of a second subset of the clinical instruments 106 (e.g., whether the plunger of a syringe is being pushed or pulled back, whether a neurostimulator is being activated, or substantially any other mechanical, electrical, or electronic output or state of a clinical instrument, etc., including electrical signals, pressures, flows, etc.).

The spatial tracking component 108 can monitor the location of the instruments or tools 106 relative to the physical anatomic model 102 in a variety of ways. For example, each of the instruments or tools 106 can have one or more sensors associated with it (e.g., a 5 degree of freedom (DOF) sensor, a 6 DOF sensor, etc.), such that spatial tracking component 108 can determine at least one of the location or orientation of each instrument or tool 106. In various information, this data can be transmitted in a wired or wireless manner. This location and/or orientation information can be associated with the virtual anatomic model 104 by mapping component 112 (e.g., by mapping the location and/or orientation data to the virtual model 304, etc.) and the position of the instruments or tools 106 can be determined relative to various anatomical features. The location and/or orientation can be determined in a variety of manners, such as via an electromagnetic tracking system. Information related to the location and/or orientation (e.g., relative to one or more anatomical features, etc.) can be provided to one or more other components (e.g., as described in connection with FIG. 2, below). For example, with a sham ultrasound probe that can be used in connection with the subject innovation, its location can be used to provide information based at least in part on detailed anatomical data (e.g., determined by MRI, CT, 3D US scan, etc., such as information that an actual ultrasound probe would obtain at a corresponding location on an actual person, etc.), the position and orientation of other instruments or tools 106, etc. This information can be provided to a user of system 100 in a variety of ways, such as how comparable information would be presented in a real-world setting with an actual patient (e.g., presenting ultrasound information on a screen, providing variable feedback based on instrument location, etc.). Additionally, tracked information can be recorded and one or more metrics can be determined based on the tracked information (e.g., location and/or orientation information, etc.), such as based on position, position as a function of time, velocity or acceleration (whether instantaneous or average), a trajectory of a clinical instrument, a volume or rate of fluid (e.g., anesthetic, etc.) dispensed (either actually or simulated) in connection with the simulation, one or more locations or tissue types associated with dispensed fluid, an elapsed time of the simulation, comparisons of any of the above with that of another user (e.g., one or more designated experts, etc.) or with past performance by the same user, or any combinations of the above. These metrics can be provided via a user interface (e.g., to a trainee or other user, to an instructor, or to both, etc.).

In other aspects, spatial tracking component 108 can be utilized in a learning mode to record expert information that can later be used for comparison with other users to gauge proficiency. One or more sessions can be recorded when system 100 is used by an expert, such that expert behavior can be used as a benchmark both for comparison with user behavior and as a target for users to develop towards.

The tracked position(s) and/or orientation(s) of the first subset of clinical instruments 106, along with data associated with the corresponding location in the virtual anatomic model 104, can be provided to an anatomic mapping component 112 (e.g., implemented as a component, etc.) that can determine at least one of an anatomic structure or a tissue type at the location(s) in the virtual anatomic model 104 corresponding to the position(s) of the first subset of the clinical instruments 106. In aspects, anatomic mapping component 112 can additionally determine further information, for example, a portion of the virtual model to render as a simulated ultrasound image (e.g., based on the location and orientation of a simulated ultrasound probe, etc.), distances to one or more anatomic features (e.g., a target location of the clinical procedure, a nearest nerve or nerves, etc.), or other information.

At least a portion of the information determined by anatomic mapping component 112 can, along with at least a portion of the information monitored by clinical instrument interface 110, be provided to a feedback determination component 114 that can determine a response of the physical anatomic model 102, virtual anatomic model 104, or clinical instruments 106 to at least a portion of the first subset and the second subset of the clinical instruments 106. Depending on the specific instruments or tools 106 being used, clinical instrument interface 110 can provide an interface capable of receiving input from and interacting with some of those instruments or tools. In one example, clinical instrument interface 110 can receive information associated with an activation, functional state or other characteristic (e.g., syringe plunger push or pull-back, neurostimulator signal rate or current, etc.) of one or more clinical instruments 108 as they interact with the physical anatomic model 102. For each instrument that feedback determination component 114 considers, the response can depend on the specific type of clinical instrument (e.g., needle tip, syringe, neurostimulator, simulated ultrasound probe, etc.) and one or more of its characteristics (e.g., position; orientation; state; outputs such as current, rate, whether it is being pushed or pulled back upon, etc.) and can depend on the tissue type associated with the location or proximity to one or more anatomic features (e.g., nerves, etc.). The determined response can include changes in the virtual anatomic model 104, changes in the physical anatomic model 102, or generated outputs to clinical instruments 106. As an example of feedback to clinical instruments 106, behaviors can be generated at the injection syringe, such as variable resistance to fluid flow and the ability to pull-back either blood simulant or clear fluid depending on needle tip location relative to the physical anatomic model 102 and the virtual anatomic model 104. For example, in a peripheral nerve block procedure, if the location of a needle tip (e.g., as mapped by anatomic mapping component 112) is near a nerve of the virtual anatomic model 104 and not in a blood vessel of the virtual anatomic model 104, activation of a neurostimulator can provide a twitch appropriate for the nerve (as feedback to the physical anatomic model 102), and pull-back on a plunger of a syringe can provide high resistance and clear fluid. In another example, if the mapped location of a needle tip is near the same nerve but in a blood vessel, a similar twitch response can be provide upon activation of a neurostimulator, but a blood-like fluid can be provided upon plunger pull-back. The twitch response can be particularized based on a number of factors as described herein, such as properties of the neurostimulator signal (e.g., rate, current, etc.), nearest simulated nerve, distance to the nearest simulated nerve, etc. Other feedbacks can include substantially any described herein, including without limitation, (e.g., actuation, change in color, change in temperature, change in stiffness or resistance, etc.).

Depending on the type or types of response determined, feedback determination component 114 can send the determination to one or more of a physical anatomic model feedback component 116 capable of generating changes in physical anatomic model 102 (e.g., changes in motion, physical properties, or other characteristics or behavior), or a clinical instrument feedback component 118 capable of generating feedback in clinical instruments 106, either or both of which will generate the determined response as appropriate. Based on the information provided, one or more of the following can be determined as a response: (1) physical anatomic model feedback component 116 can change the physical anatomic model 102, (2) the virtual anatomic model 104 can be changed, or (3) clinical instrument feedback component 118 can generate at least one output to a clinical instrument 106. Physical anatomic model feedback component 116 can generate perceptible changes in the motion, morphology, physical properties, or other characteristics or behavior of the physical model in a variety of ways, and can thereby provide realistic feedback to simulate the clinical procedure. For example, in a simulated nerve block procedure, nerve data in the virtual anatomic model 104 associated with the location of a neurostimulator relative to the physical anatomic model 102 can be used such that physical anatomic model feedback component 116 can provide appropriate twitch responses (e.g., via actuation of mechatronics, etc.) depending on which nerves would be stimulated (e.g., which of the median, ulnar, radial or musculocutaneous nerves in the arm and brachial plexus example, or other corresponding nerves in other anatomical regions, etc.) and to what extent based on data received via feedback determination component 114. In aspects, clinical instrument feedback component 118 can provide feedback appropriate to the clinical procedure being simulated by generating appropriate behaviors at the locations of various instruments or tools 106. For example, behavior that can be generated by clinical instrument feedback component 118 at an injection syringe can include variable resistance to fluid flow and the ability to pull-back either blood simulant or clear fluid depending on needle tip location. In aspects, feedback determination component 114 can employ mathematical modeling to determine the specific nature of a response (e.g., as described herein in connection with simulated twitch response, etc.). The feedback produced by physical anatomic feedback component 116 can comprise substantially any dynamic physical modification of the physical anatomic model 102. This feedback can occur in a variety of ways: movement of the physical anatomic model 102, change of shape (e.g., via simulated twitch, simulated swelling such as via inflating a balloon or bladder in response to a simulated injection, etc.), change of temperature, change of color, change of material compliance (such as stiffening or softening of simulated tissue), or changes in other mechanical, morphological, kinematic, haptic, visual, or auditory properties of the physical anatomic model 102. The feedback generated by clinical instrument feedback component 118 can comprise any of a variety of feedbacks provided to clinical instruments, such as change in resistance to pull-back of a syringe plunger, simulated blood flow or clear fluid flow into a syringe, display of an image in response to an imaging device (e.g., simulated ultrasound probe, etc.), simulation of other bodily fluids, etc.

As an example of a determined response to the physical anatomic model, activation of a neurostimulator can cause activation of mechanical actuators to simulate a muscle twitch response, wherein the twitch response can depend (e.g., type and intensity of response, etc.) on a signal from the neurostimulator (e.g., pulse rate, current, etc.) and a distance to one or more nerves near the needle tip. As an example of a determined response to the clinical instrument, pull-back on a plunger of a syringe can encounter variable resistance depending on tissue type associated with a needle tip, and can provide one of a plurality of clear or colored (e.g., blood-like) liquids. While components discussed herein are illustrated as separate components, it is to be understood that all or a subset of the components (and corresponding functionality) can be collocated in alternative aspects without departing from the spirit and/or scope of the innovation described and claimed herein, and components discussed in connection with FIG. 1 can perform functions such as those described in connection with similar features herein (e.g., in connection with other embodiments or prototypes, etc.).

Figure 2:
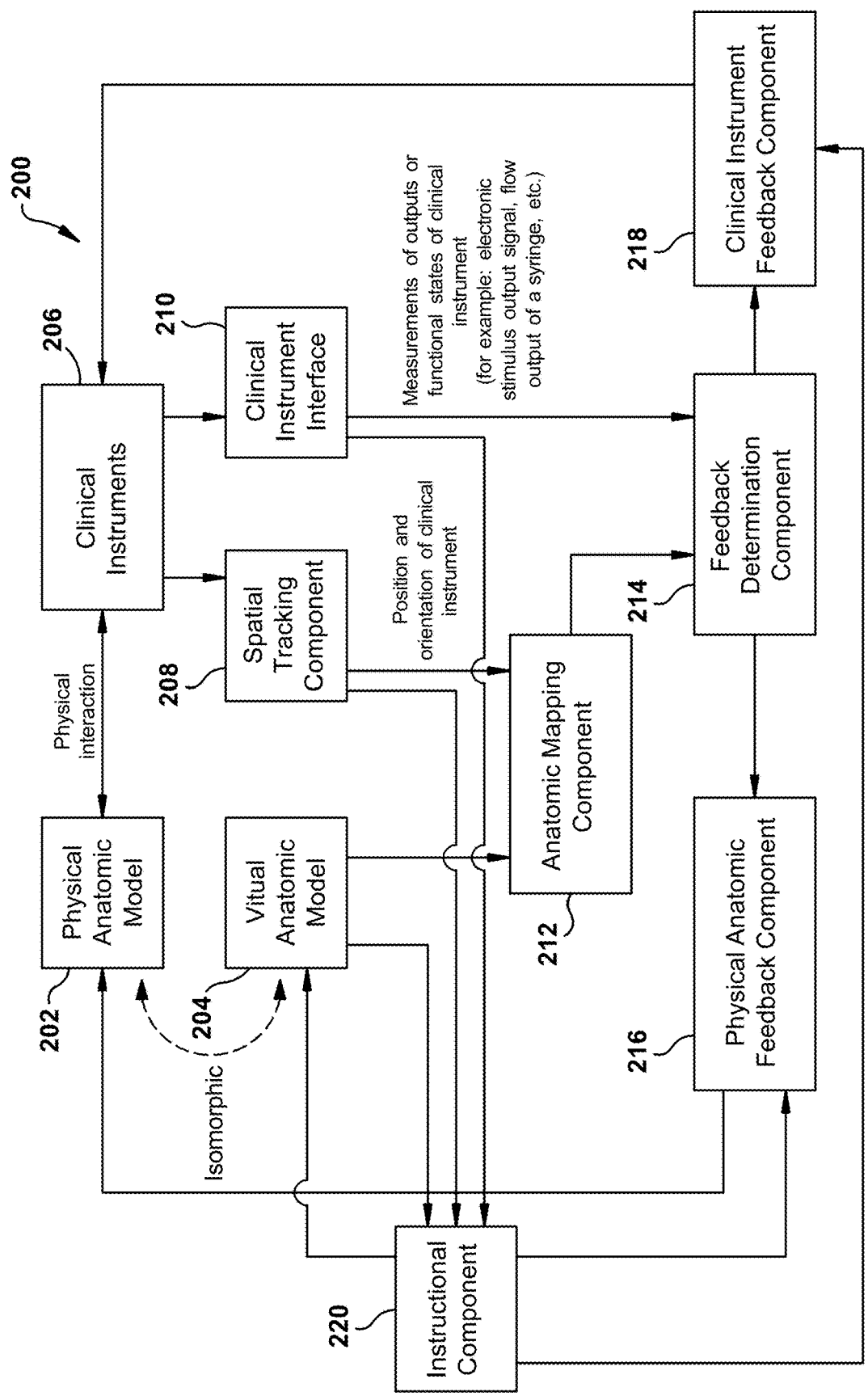
FIG. 2 illustrates another embodiment of a system that can further enhance and facilitate training in a simulated clinical procedure via a hybrid physical-virtual model.

FIG. 2 illustrates another embodiment of a system 200 that can facilitate training in a simulated clinical procedure via a hybrid physical-virtual model. System 200 can comprise a physical anatomic component 202, a virtual anatomic model 204, one or more clinical instruments 206, a spatial tracking component 208, a clinical instrument interface 210, an anatomic mapping component 212, a feedback determination component 214, a physical anatomic feedback component 216, and a clinical instrument feedback component 218, each of which can be substantially as described herein in connection with FIG. 1 or elsewhere.

Additionally, system 200 can comprise an instructional component 220 that can receive at least a subset of the data output from one or more of virtual anatomic model 204 (e.g., tissue types, anatomic structures, associated locations, etc.), spatial tracking component 208 (e.g., position and/or orientation data for any or all tracked clinical instruments 206, etc.), clinical instrument interface 210 (e.g., measured outputs or functional states for one or more clinical instruments 206, etc.). In aspects, instructional component 220 can provide an interface for a user of the system, and can facilitate training as described herein. For example, information can be provided via a trainee interface to a user of system 200, for example, on a screen, display or other user interface, such as by providing additional information that can facilitate training such as described herein or in connection with a screen providing ultrasound data, etc.

Alternatively or additionally, instructional component 220 can provide an interface for an instructor, teacher or other entity, which can be used to monitor one or more aspects of the simulated clinical procedure, or can be used to determine one or more responses to be implemented by at least one of physical anatomic feedback component 216 or clinical instrument feedback component 218. These determined responses of instructional component 220 can be generated automatically, generated by an instructor, generated by a user, etc. In aspects, instructional component 220 can provide information to an instructor not provided to a user of the system. Such information can be provided via an instructor interface (e.g., comprising a display, etc.) to an instructor who can monitor additional information that can be collected by system 200 and useful for training purposes. This information can include information that would not be available to a clinician in the procedure being modeled, as well as information that would be difficult for an observer to ordinarily obtain, and can include positions of various instruments; distances to various anatomical features (e.g., bone, blood vessels, fascicle, nerve, etc.); whether, how, and to what extent instruments are used (e.g., whether the user is pushing or pulling back on a plunger, amount of fluid injected into various tissue, etc.). As examples, this can include information based on an orientation, path or trajectory of one or more clinical instruments 206; a measure of tissue disruption caused during the simulated clinical procedure; a measure of the simulated clinical procedure according to one or more metrics, or in comparison to one or more prior simulations (e.g., prior simulations by the same user, or by another user such as an expert performance of the clinical procedure, etc.).

In various aspects, instructional component 220 can facilitate training of a user of the system. Instructional component 220 can provide one or more tutorials wherein a user can interact with a portion of the simulated clinical procedure. For example, a user (e.g., one unfamiliar with the procedure, etc.) can be provided tutorials that can familiarize users with expected feedbacks, such as those associated with desired and/or undesired results upon manipulation of a clinical instrument 206. Specific examples can include demonstration of a twitch response (e.g., potentially followed by user duplication, etc.), familiarizing users with the resistance to pull-back of a plunger (or fluid dispensed) associated with a blood vessel or when in soft tissue, or other feedbacks, etc.

Additionally, instructional component 220 is capable of displaying and/or modifying virtual anatomic model 204, such as for training purposes. For example, specific portions can be displayed in connection with one or more tutorials. In one aspect, instructional component 220 can modify virtual anatomic model 204 to simplify virtual anatomic model 204, such as by removing one or more features from the virtual anatomic model 204 (e.g., removing blood vessels from a simulated peripheral nerve block procedure, etc.), by altering one or more properties (e.g., the size, shape, location, etc.) of one or more anatomic structures or tissue types of virtual anatomic model 204 (e.g., by providing a larger or less complex (e.g., straighter, etc.) nerve in a simulated peripheral block procedure, by providing it in an easier to access area, etc.). In another example, during a training session, information associated with a preferred or expert performance of a clinical procedure can be provided to a user of system 200, such as by indicating, emphasizing or highlighting one or more of an area or trajectory associated with such a preferred or expert performance. In one such example, such a training session can provide an expert trajectory of a clinical instrument 206 for a user to attempt to follow while learning a clinical procedure (e.g., by displaying the real-time position of the clinical instrument 206 as manipulated by the user and an expert trajectory on at least a portion of the virtual anatomic model 204, such as via a screen, etc.).

As a user develops proficiency, instructional component 220 can vary virtual anatomic model 204 in subsequent simulations to adapt system 200 to a learner, such as by altering the complexity of the simulated clinical procedure or focusing instruction on specific aspects. In one example, as a user develops proficiency, additional details can be added to virtual anatomic model 204 (e.g., blood vessels, etc.), anatomic structures can approach realistic properties (e.g., progressively smaller nerves in subsequent simulations, etc.), etc. In other examples, proficient or expert users of a system can be provided with more difficult simulations, such as a virtual anatomic model 204 with one or more anatomic variations, for example, with one or more properties of one or more anatomic structures or tissue types varied according to a known or unique anatomic variation, including variations that may be encountered in clinical practice, but only rarely. These sorts of learner-adaptive behaviors by the system can facilitate both initial acquisition of skills by novices and enhance high-levels of expertise by more advanced users. In the case of more advanced users, the system can provide practice on cases that may be encountered infrequently in actual clinical practice and thereby broaden the exposure of trainees to a wider range of clinical cases than might be encountered during standard clinical training on actual patients.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 3:
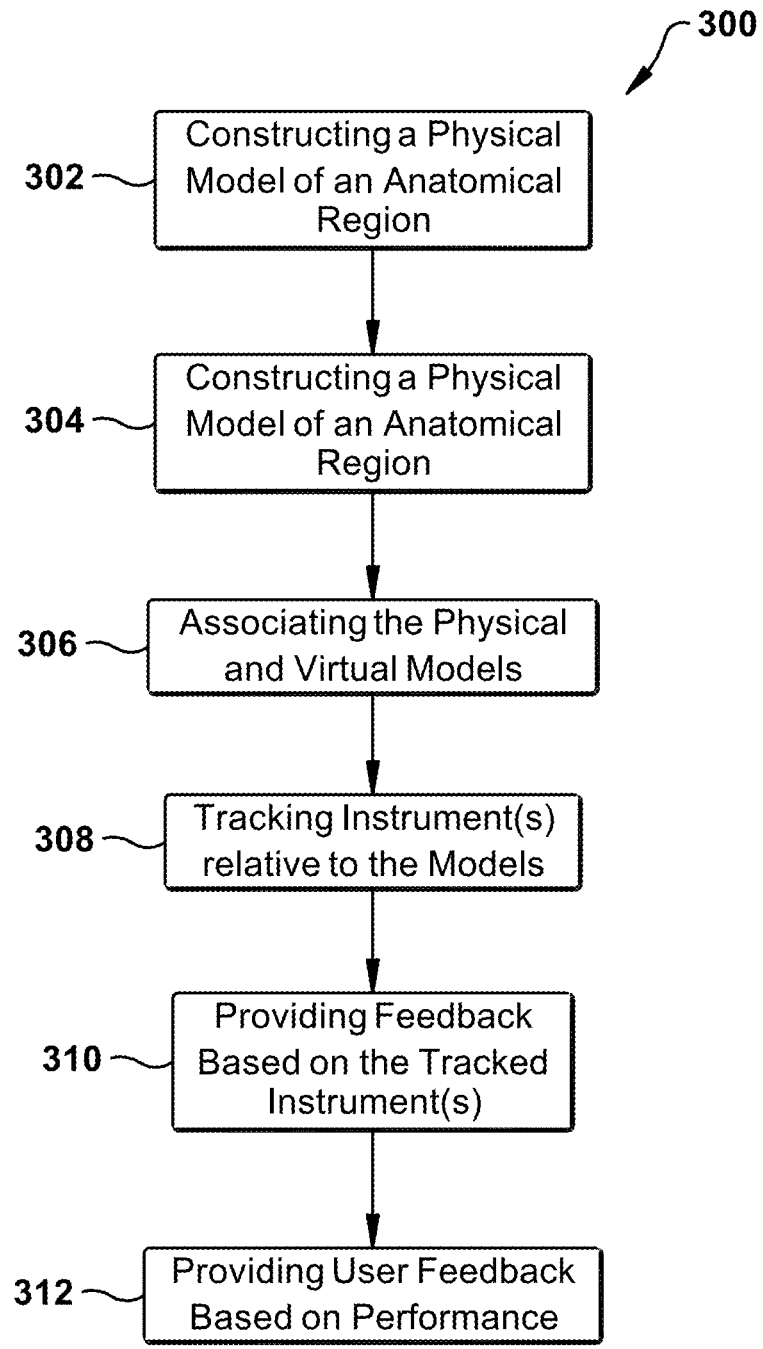
FIG. 3 illustrates a methodology of facilitating clinical training via a mixed reality model in accordance with aspects of the innovation.

Referring now to FIG. 3, there is illustrated a methodology 300 of facilitating clinical training via a mixed reality model in accordance with aspects of the innovation. The method can begin at step 302 by constructing a physical model of an anatomical region. This can be done in a variety of ways, such as described herein (e.g., creating a mold of the region, taking an MRI (CT, 3D US, etc.) scan of the region, and building a model of the region based at least in part on the mold and the MRI (etc.) scan). Next, at step 304, a virtual model of the anatomical region can be constructed, which can also be based at least in part on the MRI scan, and can involve segmenting one or more anatomical features (e.g., skin, blood vessels, fascia, nerves, etc.) from the MRI (etc.) scan and incorporating such features into the virtual model. The virtual model can be associated with the physical model at step 306, correlating features and their locations on the physical and virtual models, which can include associating tissue types defined or recorded in the virtual model with corresponding locations in the physical model. Next, at step 308, the location and/or orientation of one or more clinical instruments can be tracked as a user performs a simulated clinical procedure on the physical and verbal models. At step 310, feedback can be provided based at least in part on the location and/or orientation of the tracked instruments and a tissue type associated with that location, as described herein (e.g., visual, auditory, or haptic feedback; varying the type of fluid provided on plunger pullback based on location; etc.). Finally, at step 312, the user can be provided feedback based at least in part on performance of the simulated clinical procedure.

Figure 4:
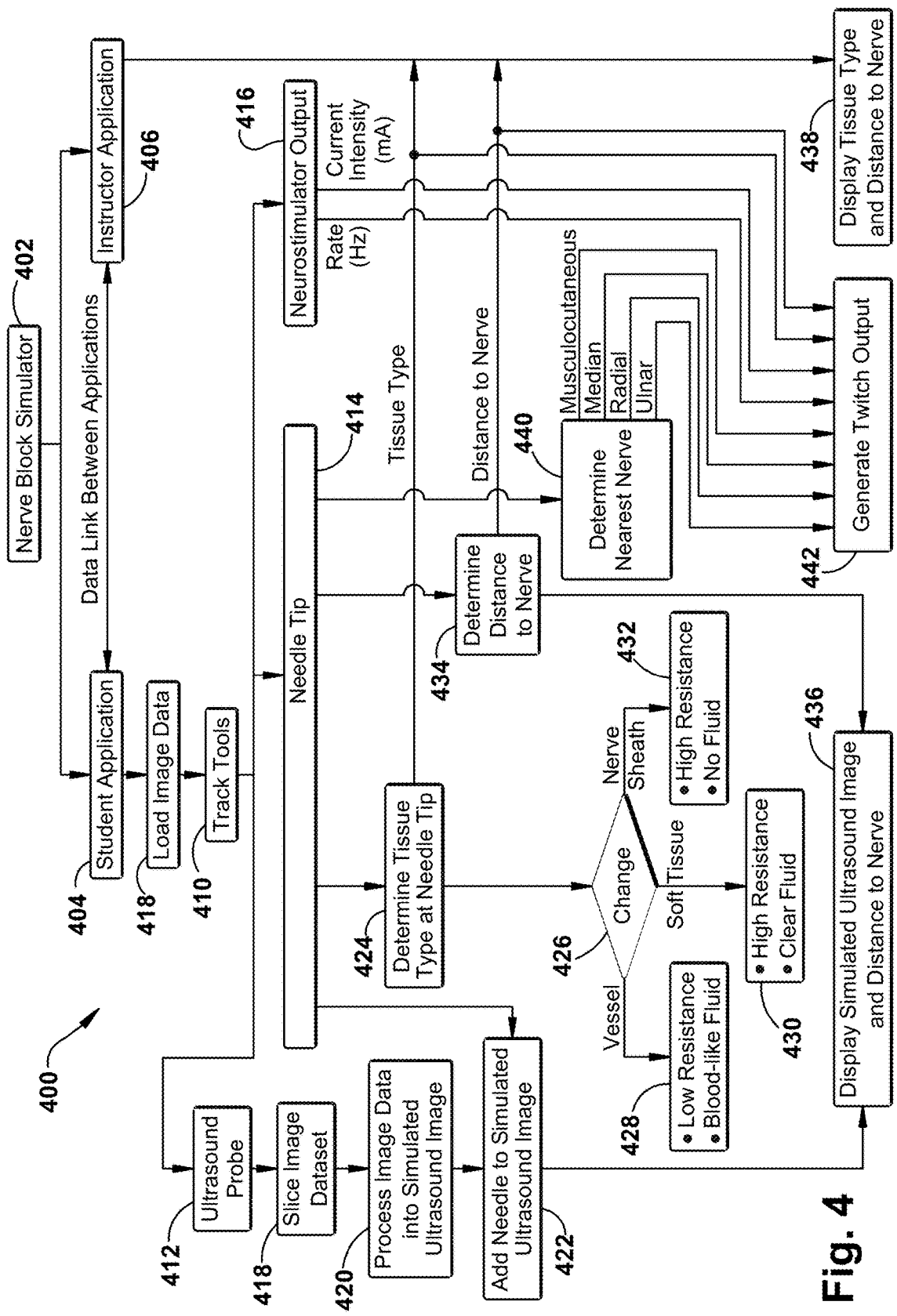
FIG. 4 shows an example system diagram of one embodiment of a hybrid physical-virtual system useable as a nerve block simulator.

FIG. 4 shows an example system diagram of one embodiment of a hybrid physical-virtual system 400 useable as a nerve block simulator 402. It is to be appreciated that although system 400 relates specifically to a nerve block procedure, other embodiments of the subject innovation may simulate other procedures. Additionally, not all of the features of system 400 need be included in embodiments in accordance with the subject innovation, and the system may be varied in other ways, as well, as will be apparent to a person of skill in the art in light of the disclosure herein. Simulator 402 can comprise both a student application 404 and an optional instructor application 406. In some aspects, student application 404 can load image data as shown at 408 (e.g., for sham or simulated ultrasound images, or MRI/CT/US scan data, etc.), and can track one or more instruments or tools as shown at 410 to determine location, orientation, etc. (e.g., velocity, acceleration, etc.).

The tools that can interact with a physical model and associated isomorphic virtual model of simulator 402 can include an ultrasound probe 412, a needle tip 414, and the output of a neurostimulator 416, although not all of these tools need be utilized, and in other embodiments, other tools may be used instead or additionally.

In connection with the ultrasound probe 412, internal information associated with the model can be analyzed at 418, which can include, for example, slicing an image dataset obtained from an MRI scan or elsewhere, wherein the selected slice can be based on the position (and orientation, etc.) of the US probe 412. This selected or sliced image data can be processed into a simulated ultrasound image as indicated at 420. Based on this simulated image and the position of the needle tip 414, the needle tip can be added to the simulated US image at 422.

Based on the tracked position (and potentially orientation, etc.) of the needle tip 414 relative to the physical model, the tissue type at the needle tip can be determined at 424, e.g., by determination of the tissue type associated with the corresponding location in the virtual model. This tissue type information can also be relayed to the instructor application 406. At 426, potential feedbacks to a user of the system can change, based at least in part on the determination of the tissue type at 424. For example, if the tissue is a blood vessel, at 428, plunger response can provide low resistance, and pull-back can provide a blood-like fluid. On the other hand, if the tissue type is soft tissue, there can be high resistance, and a clear fluid provided on pull-back, as seen at 430. Or, if the tissue type is a nerve sheath, then there can be high resistance with no fluid upon pull-back, as shown at 432. Also based on the tracked position of the needle tip, the distance to a target nerve can be determined at 434, based at least in part on the location(s) of one or more nerves associated with the virtual model. This distance can be provided to the instructor application 406, and can be used to display both the simulated US image and distance to nerve to the student application 404, based also on the simulated US image with needle tip created at 422. Using the determined tissue type from 424 and nerve distance from 434, this information can be displayed at 438 via instructor interface 406, to provide information that can be used to evaluate student or trainee performance.

Additionally, based on the location (and orientation, etc.) information of the needle tip 414, the nearest nerve can be determined at 440. For example, in a brachial plexus peripheral nerve block embodiment, this nerve can be one of the musculocutaneous, median, radial, or ulnar nerves, as indicated. Based on the determined nearest nerve from 438 and the output of the neurostimulator at 416 (e.g., based at least in part on the rate and intensity of the output, etc.), an appropriate twitch response can be determined and generated (e.g., via mechatronics, etc.) at 442.

In various aspects, for example, embodiments related to anesthetic injection (e.g., peripheral nerve block, etc.), in contrast with prior art simulators, the subject innovation can realistically simulate tactile interaction with the extremity, ultrasound imaging, neural stimulation and feedback at the anesthetic syringe. The innovation's approach, a hybrid physical-virtual reality system, can address each of these areas (and other comparable areas in connection with other procedures) with realistic perceptual simulation and performance measurement.

Systems and methods of the subject innovation can provide objective performance measurement, a feature enhancement provided by the subject innovation that is not provided during current practice on real patients. This performance measurement can be used for training in a procedure associated with the particular embodiment of the subject innovation. Trainee performance can be quantified in real-time and feedback on performance can be provided. For example, experts can use the system and their performance can be tracked and stored for reference. Additionally, novice learners can then be objectively assessed with reference to empirically-measured benchmarks of expertise. Simulation systems and methods of the subject innovation can offer significant benefits, including the ability to deliver repetitive training with no risk or discomfort to a patient; the capability to deliver, on-demand, a wide range of clinical procedure scenarios and anatomic variations; and the ability to establish objective, quantitative metrics of performance that can support standardized assessment of proficiency. Moreover, the development of the subject innovation further safeguards patient safety, for if effective simulation-based alternatives are available, no patient need or should be used as training material for procedures that are painful or pose a risk to patient safety. In such cases (e.g., regional anesthesia, etc.), simulation-based training is not simply expedient or a good idea, it is an ethical mandate.

In various aspects, the systems and methods can employ details specific to the particular clinical procedure being simulated. Although a wide variety of clinical procedures can be simulated, and the details of specific procedures will depend on the procedure, specific embodiments can be designed for specific procedures, and can provide a hybrid physical-virtual model of an anatomic region that can provide for monitoring of one or more instruments used in connection with that region for a procedure. Using systems and methods discussed herein, users can receive feedback allowing training in connection with these procedures, and thus develop clinical skills while reducing risk to patients associated with such training.

To aid in the understanding of aspects of the subject innovation, specific experimental tests and prototypes related to specific clinical procedures and results and details associated with those tests and prototypes are discussed herein. However, although for the purposes of providing the details discussed herein, specific choices were made as to the selection of various aspects of the prototypes and associated setups—such as the particular clinical procedure being simulated (e.g., anesthetic injection, such as peripheral nerve block; etc), choice of specific materials, setup of interface, specific algorithms implemented, etc.—the systems and methods described herein can be employed in other contexts, as well.

Figure 5:
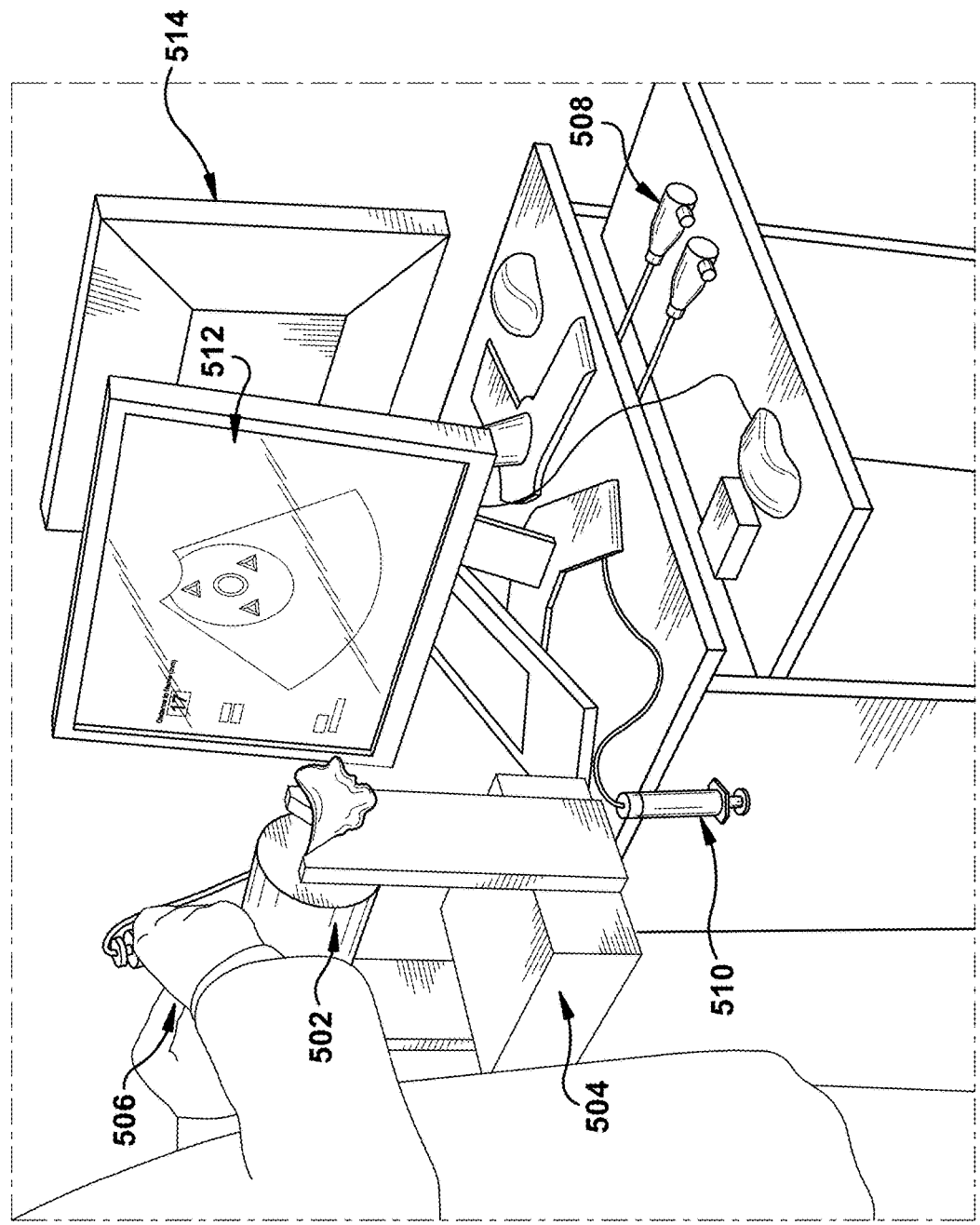
FIG. 5 shows a photograph of an example prototype of a hybrid physical-virtual model in accordance with aspects of the innovation described herein.
Figure 6:
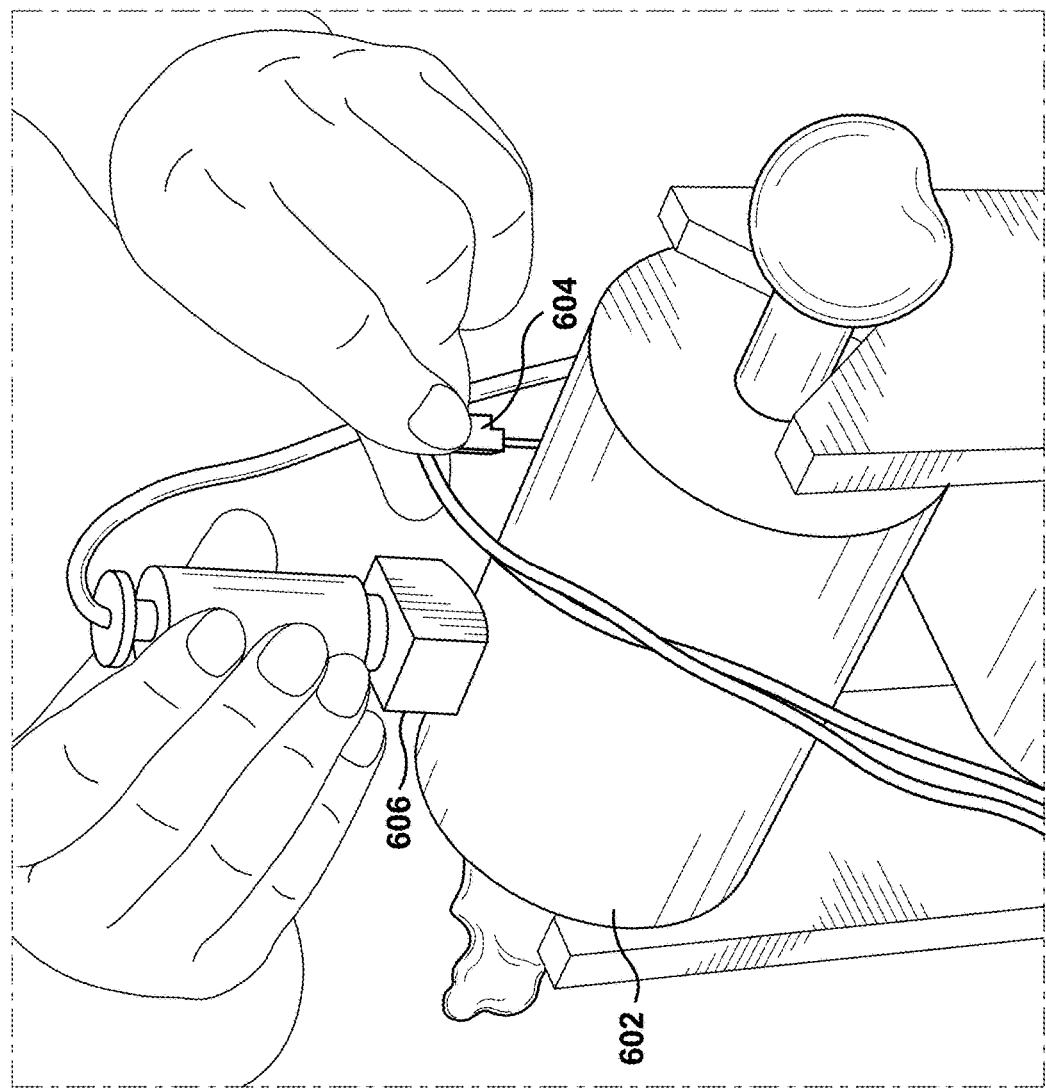
FIG. 6 shows a closeup of a portion of the prototype shown in FIG. 5.

Turning to FIG. 5, shown is a photograph of an example prototype of a hybrid physical-virtual model in accordance with aspects of the innovation described herein. This prototype was used to test and verify the functionality of various aspects of the system. The model utilized a translucent cylindrical silicone phantom cylindrical phantom "limb" 502 and corresponding virtual model that a trainee or other user of the system was capable of performing the simulated procedure on (the procedure was a peripheral nerve block for the prototype shown, although other procedures can be simulated in accordance with various aspects of the subject innovation). At 504 was an electromagnetic field generator that could be used to track the instruments 506 interacting with the model via a sensor fitted on each of a sham ultrasound (US) probe and a block needle. At 508 was a syringe simulation subsystem used to provide various feedbacks to an anesthetic syringe 510, such as variable resistance to fluid flow and the ability to pull-back either blood simulant or clear fluid depending on needle tip location. A display for a trainee or user was included at 512, which provided various feedback and data to the user, including display corresponding to the sham ultrasound probe, etc. At 514, another display was included for instructor monitoring of the simulated procedure. Experiments conducted with the system verified physical-virtual registration and that needle tip contact with soft tissue, nerve or vessels was correctly identified. The syringe simulator provided blood simulant during pull-back when the needle tip contacted a virtual vessel and varied flow resistance depending on tip location. In addition, metrics were computed on needle tip trajectories, including total path length and instantaneous and average velocity and acceleration. FIG. 6 shows a closeup of a portion of the prototype shown in FIG. 5. The cylindrical arm phantom 602 can be seen, as can the tracked block needle 604 and tracked sham US probe 606. Although the needle and probe used in the prototype and shown in FIG. 6 transmitted information (e.g., tracking, etc.) in a wired manner, it is to be appreciated that wireless (e.g., Bluetooth, etc.) transfer could also be used.

Figure 7:
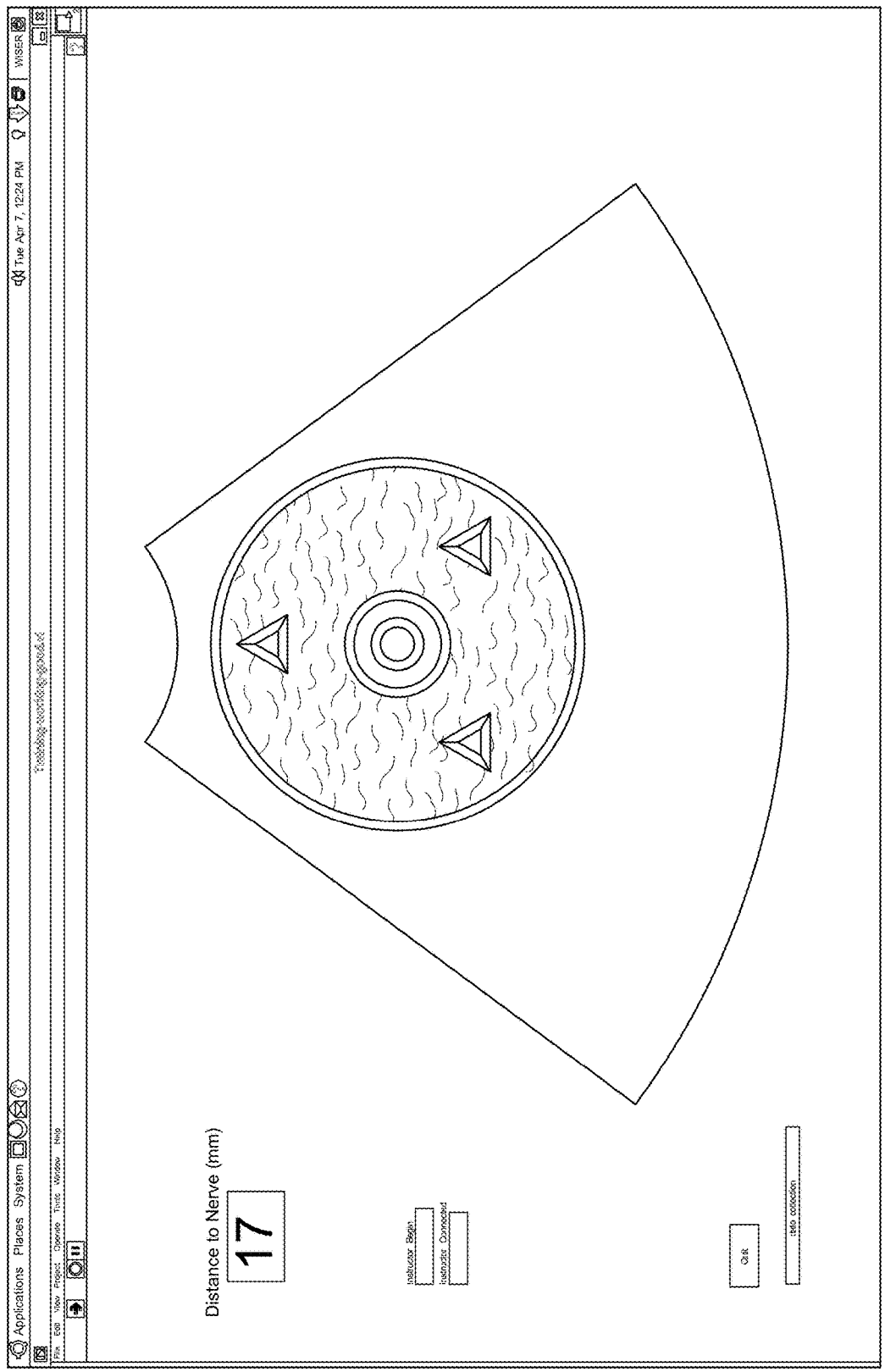
FIG. 7 shows an example display on a prototype student interface in accordance with the system shown in FIG. 5.
Figure 8:
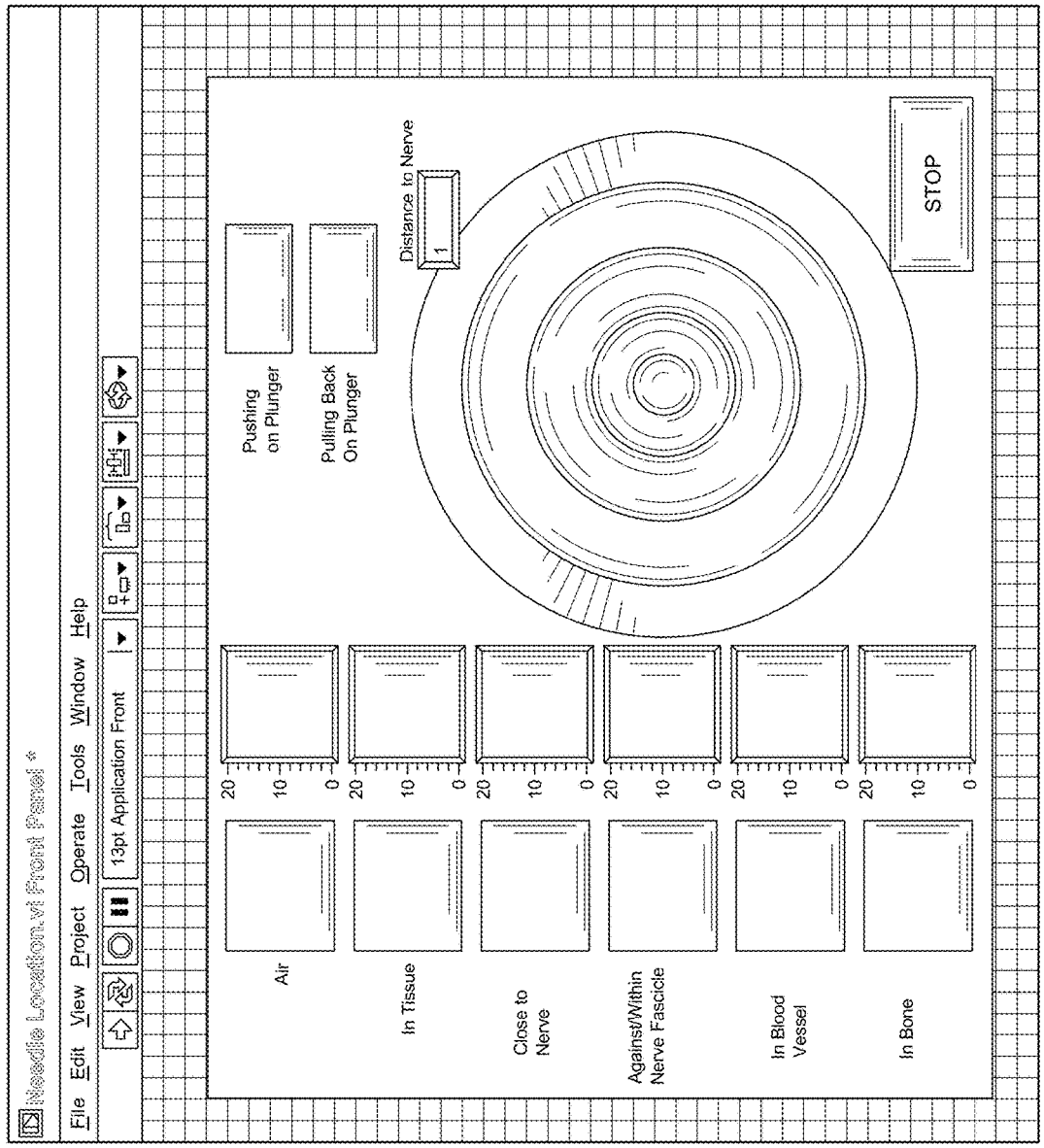
FIG. 8 illustrates an example display of a prototype instructor interface in accordance with the system shown in FIG. 5.

FIG. 7 shows an example display on a prototype student interface in accordance with the system shown in FIG. 5. As can be seen, there was a simulated ultrasound image in the interface, as well as information indicating the distance from the needle to the nerve (17 mm in the example screenshot shown). FIG. 8 illustrates an example display of a prototype instructor interface in accordance with the system shown in FIG. 5. As can be seen, the instructor interface can provide indicators identifying the anatomical feature (e.g., tissue type or structure, etc.) at the current needle tip location (the color-coded indicators to the left in FIG. 8). Additionally, other indicators can display the volume of fluid that has been injected into each tissue type (shown in FIG. 8 via the gray indicators). The interface also indicates whether or not the plunger of the syringe is being pushed or pulled back, as well as a proximity of the needle tip to the nerve (both graphically via the colored rings, and numerically, as can be seen above the rings).

The prototype shown in FIGS. 5 through 8 had numerous capabilities that other systems and methods of the subject innovation can have (although that prototype did not have all features discussed herein). The system shown in FIGS. 5 through 8 tracked the replica ultrasound probe and the needle tip, and the student or trainee interface or application was capable of displaying the virtual ultrasound image that corresponds to the cylindrical phantom anatomy and calculating the needle to nearest target nerve distance (which was also displayed on the screen). The instructor application communicated with the student application and provided the instructor with needle to nerve distance, current tissue type the needle tip is located in (air, tissue, vessel, nerve, bone), and provided a 'bull's-eye' visualization of the needle tip approaching the nerve. Additionally, the instructor application communicated with a data acquisition card to control the twitch mechanism and syringe injection system to provide appropriate feedbacks to the student or trainee via the system. The syringe injection system provided haptic and visual feedback to user: visual feedback included the appearance of blood in the syringe if pulled back while within a blood vessel, as well as the impression that the injected fluid is passing through the needle (although it was actually being redirected into the syringe injection system); the haptic feedback included increased pressure if trainee tried to inject when the needle tip is in the nerve fascicle. A flow meter in series with the syringe line measured flow rate during injection, which could be integrated to determine volume of fluid injected. Volume and location of fluid injected was displayed on the instructor interface, although in other embodiments, the measured injected fluid volume can be used to provide feedback in other manners, such as using it as a real-time input parameter to model a visible bolus of fluid in the vicinity of the needle tip on the simulated ultrasound display.

Figure 9:
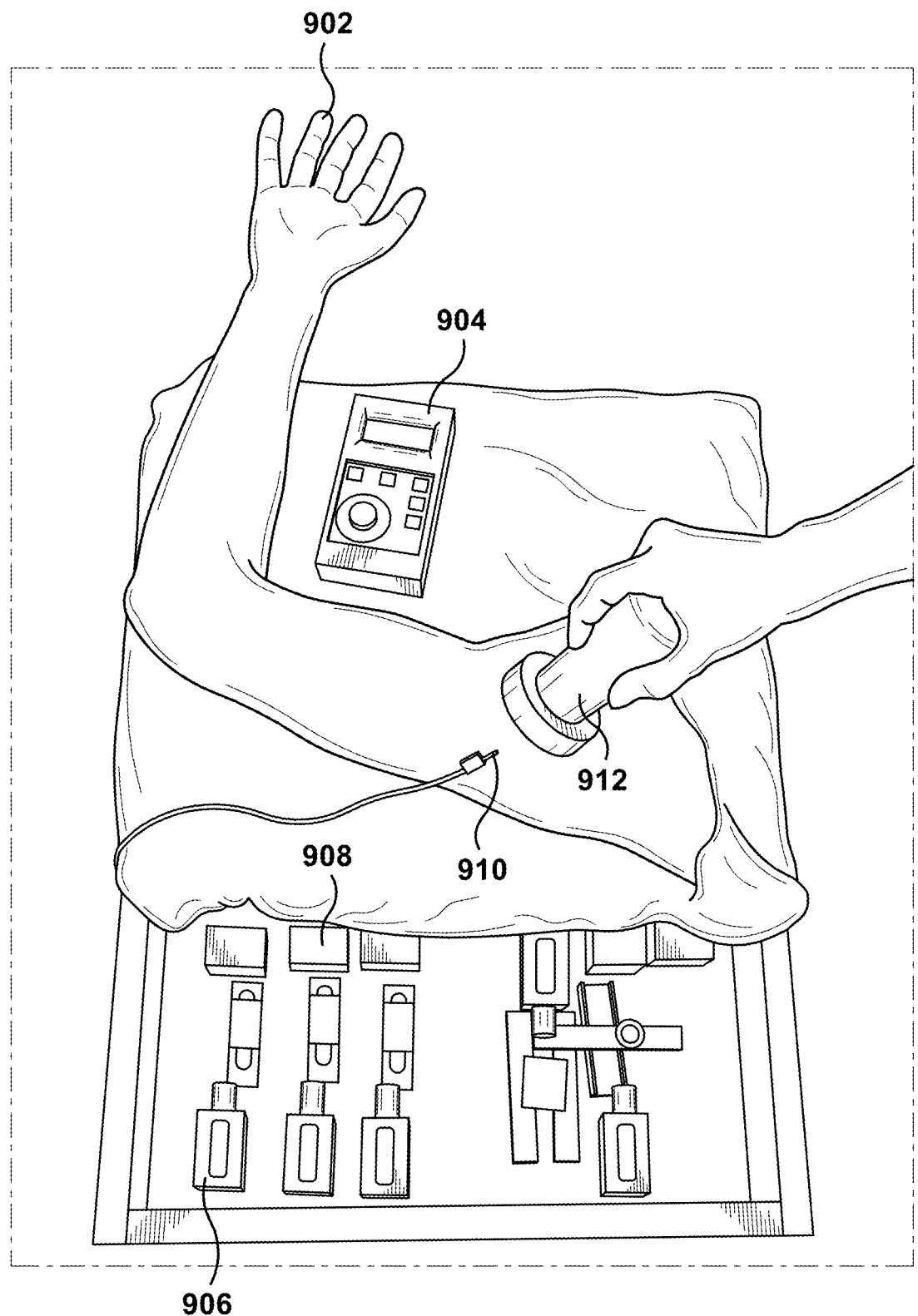
FIG. 9 shows a photograph of a second example prototype of a hybrid physical-virtual model in accordance with aspects of the innovation described herein.
Figure 10A:
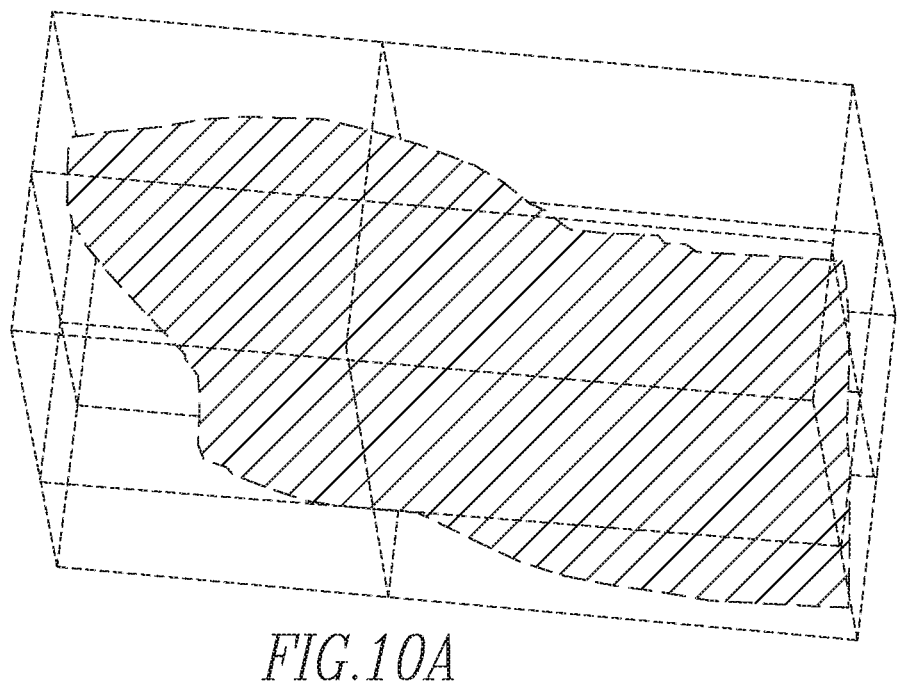
FIGS. 10A and 10B show a portion of an MRI-derived virtual model used in connection with the physical model shown in FIG. 9.
Figure 10B:
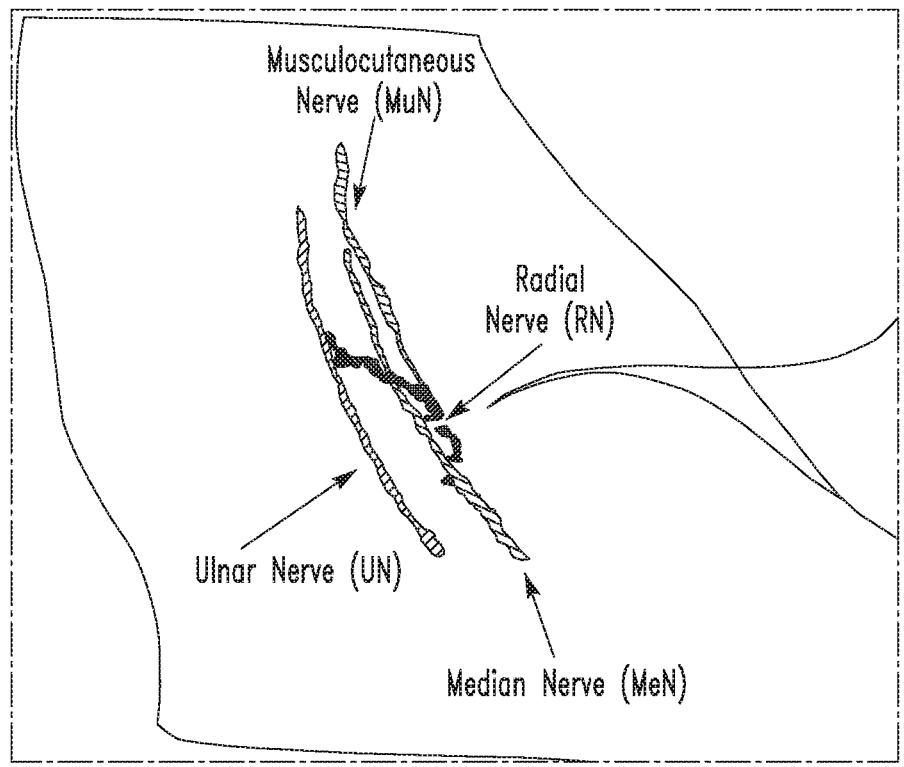

FIG. 9 is a photograph of a second example prototype of a hybrid physical-virtual model in accordance with aspects of the innovation described herein. The prototype in FIG. 9 includes a physical arm model 902 that was fabricated via lifecasting and stereolithography (although other 3D printing techniques can also be used) as described further herein. At 904 is shown a standard commercial neurostimulator that can be used in connection with the system. Actuators and driver electronics (implemented in FIG. 9 via solenoids 906 and 908, although other ways of generating response are possible) can model appropriate feedback (e.g., twitch response, etc.) of the model to instruments or tools (e.g., needle 910, neurostimulator 904, sham ultrasound probe 912, etc.) used to interact with the physical model 902. The full extremity mechatronic model of FIG. 9 displayed four- and two-finger twitch, elbow extension and flexion, and wrist adduction as well as graded response to intensity. FIG. 10A shows portions of an MRI-derived virtual model used in connection with the physical model shown in FIG. 9. Visible in the images of the virtual model of FIG. 10 is segmentation of the brachial artery and vein in FIG. 10A, as well as the nerves of the brachial plexus, identified in FIG. 10B. The corresponding isomorphic virtual model used in connection with FIG. 9 had segmented skin, fascia, brachial artery and vein, and nerves of the brachial plexus.

The prototype of FIGS. 9 and 10 had a physical model with realistic appearance, internal anatomy, and haptic response (e.g., to needle puncture of skin, fascia, etc.), as well as simulated muscular (twitch) response to neurostimulator input, giving the ability to provide realistic visual feedback. The virtual model comprised segmented nerves and blood vessels useable in combination with an electromagnetic tracking system to calculate locations of instruments (e.g., needle tip, sham ultrasound probe, etc.) and distances, such as needle to nerve distance, as well as the ability to generate a virtual ultrasound image of the brachial plexus. The virtual model can interact with the physical model to associate these anatomical features with specific locations in the physical model that the instruments or tools (e.g., needle tip, neurostimulator, ultrasound probe, etc.) can interact with, where, as described herein, feedback (e.g., actuation, etc.) was able to be provided as changes in the physical model or outputs to instruments or devices based on interactions with the virtual model.

Figure 11A:
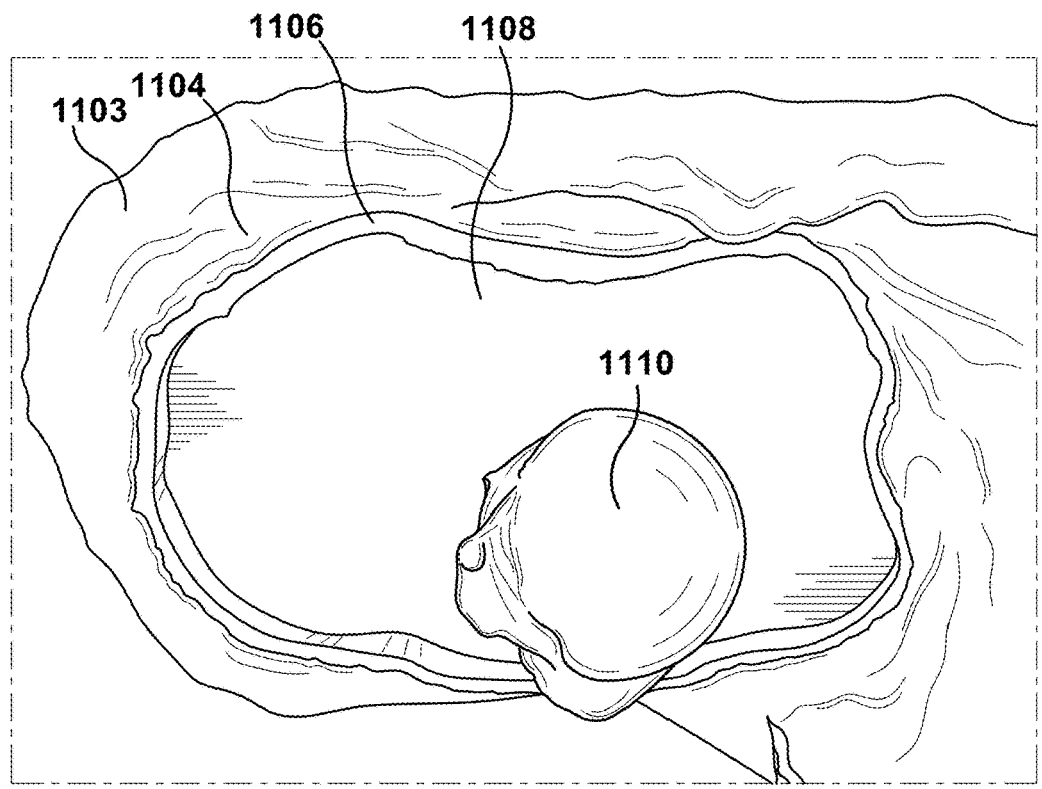
FIGS. 11A and 11B show an internal view of the four layers of the physical model of the prototype of FIG. 9.
Figure 11B:
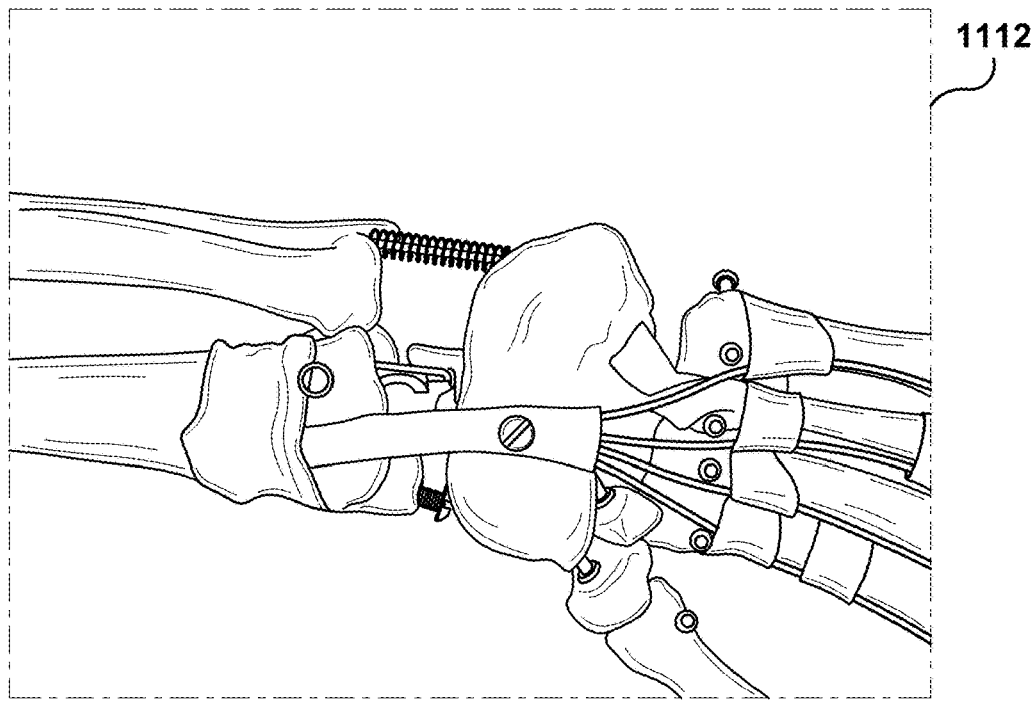

Both the physical and virtual models of the prototype of FIGS. 9 and 10 were built based at least in part on an MRI scan performed of an arm, held in place by a mold that captured skin details. Nerves, blood vessels, fascia, skin, and other relevant anatomy were segmented (using MIMICS, by Materialise) to create a virtual model that was registered to the physical model to track needle distance. Different silicone mixtures were used to replicated the haptic resistance to needle insertion of each tissue in the arm, as seen in FIG. 11A, showing an internal view of the four layers of the physical model of the arm—skin at 1103, fat at 1104, fascia at 1106, and soft tissue (muscle) at 1108—along with the bone structure 1110. FIG. 11B shows internal skeletal structure of the physical model, in which can be seen actuation cables and other components used to generate twitch response.

Figure 12A:
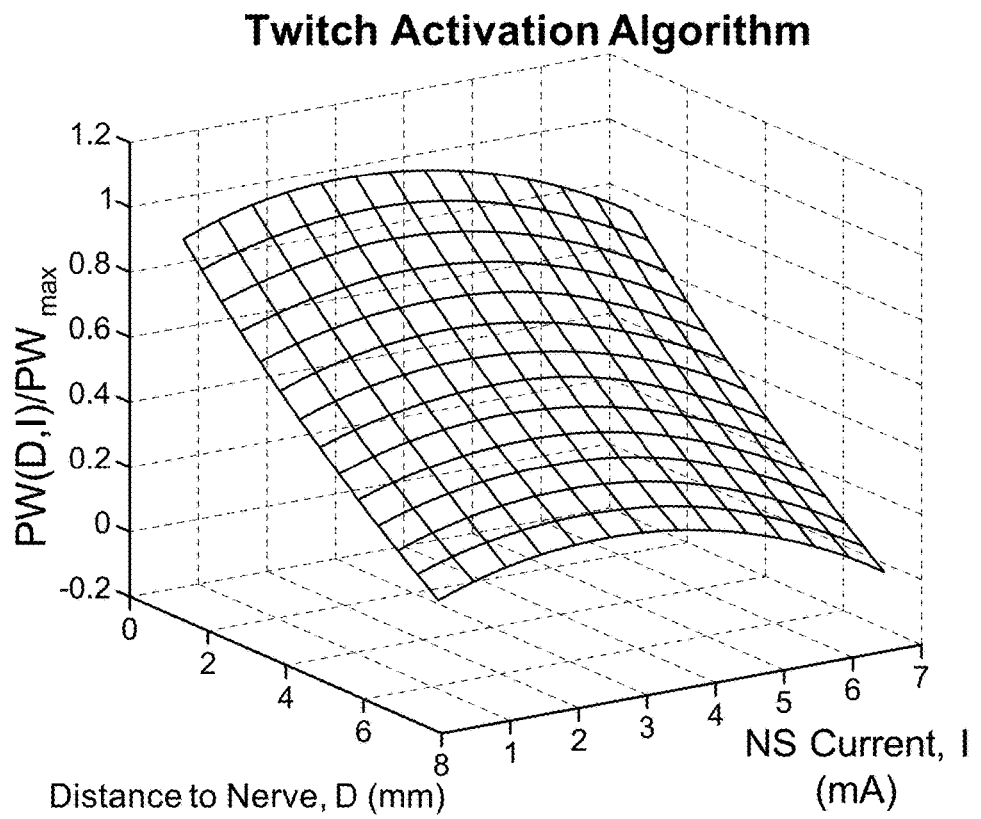
FIG. 12A shows a graph of a twitch activation algorithm used in connection with the prototype of FIG. 9.
Figure 12B:
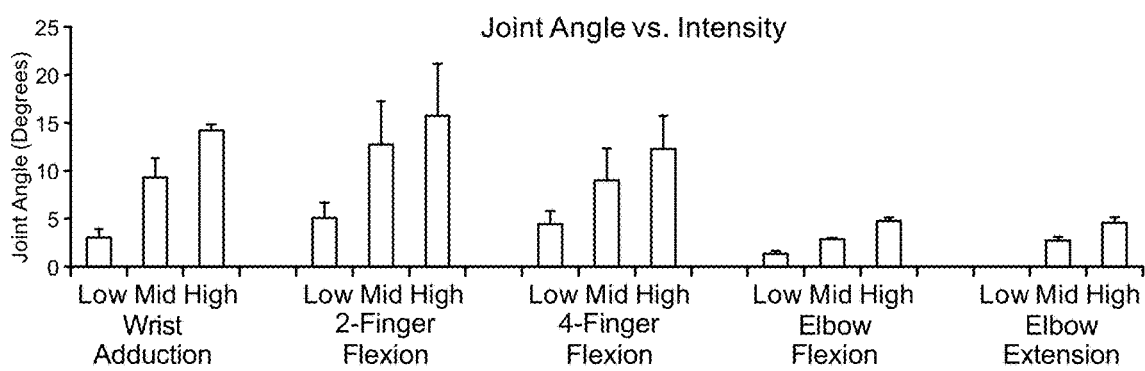
FIG. 12B shows a chart of differentiated motor responses of the prototype of FIG. 9 based on varied neurostimulator outputted intensity.

Twitch response was produced via physical actuation of moveable parts of the anatomic model (for example, the fingers, hand and wrist in a model of the arm). Actuation was provided (as one of the forms of feedback provided by the prototype) to generate simulated muscle twitches, which in the model was accomplished via solenoids 906 and actuation cables 908. The intensity of muscle twitches was controlled with pulse width modulation of the solenoids, although other techniques could be used, such as linear or rotary actuators or motors, whose motion is communicated to parts of the anatomic model via connecting linkages, such as via cable drives. Needle-to-nerve distance and neurostimulator current were measured and used to determine the length of the pulse, generating movement of the skeletal structure implanted in the arm for each of four twitches: (a) musculocutaneous nerve, for flexion at the elbow, (b) radial nerve, for extension at the elbow, (c) ulnar nerve, for adduction of the wrist and flexion of the fourth and fifth fingers, and (d) median nerve, for flexion of all four fingers. Flexion was based on a polynomial fit (although a different fit could be used in other aspects) of twitch response data to form a twitch activation algorithm used by the simulator prototype. The function, a graph of which can be seen in FIG. 12A, outputted a pulse width (PW) dependent on neurostimulator current (I) and needle-to-nerve distance (D), where $PW_{max}$ was the maximum PW for each twitch, according to $PW(D, I) = PW_{max}(0.825 - 0.326D + 0.199I + 0.008D^2 + 0.028DI - 0.341I^2)$. The equation was based both on the choice of data fitting (polynomial) and the specific data set used, both of which could vary. The geometry and morphology of the physical arm and needle to nerve distance relationship between the physical and virtual model can be verified based on registration of the segmented model with the tracking system. FIG. 12B shows the ability of the simulator to create differentiated motor responses based on varied outputted intensity.

Feedback of the prototype of FIGS. 9 and 10 was obtained from clinical experts in terms of a level of realism of the simulation, and specific aspects were identified for further improvement. For various other embodiments related to other clinical procedures, feedback from clinical experts can be incorporated to improve the realism of those simulations, as well.

Figure 13:
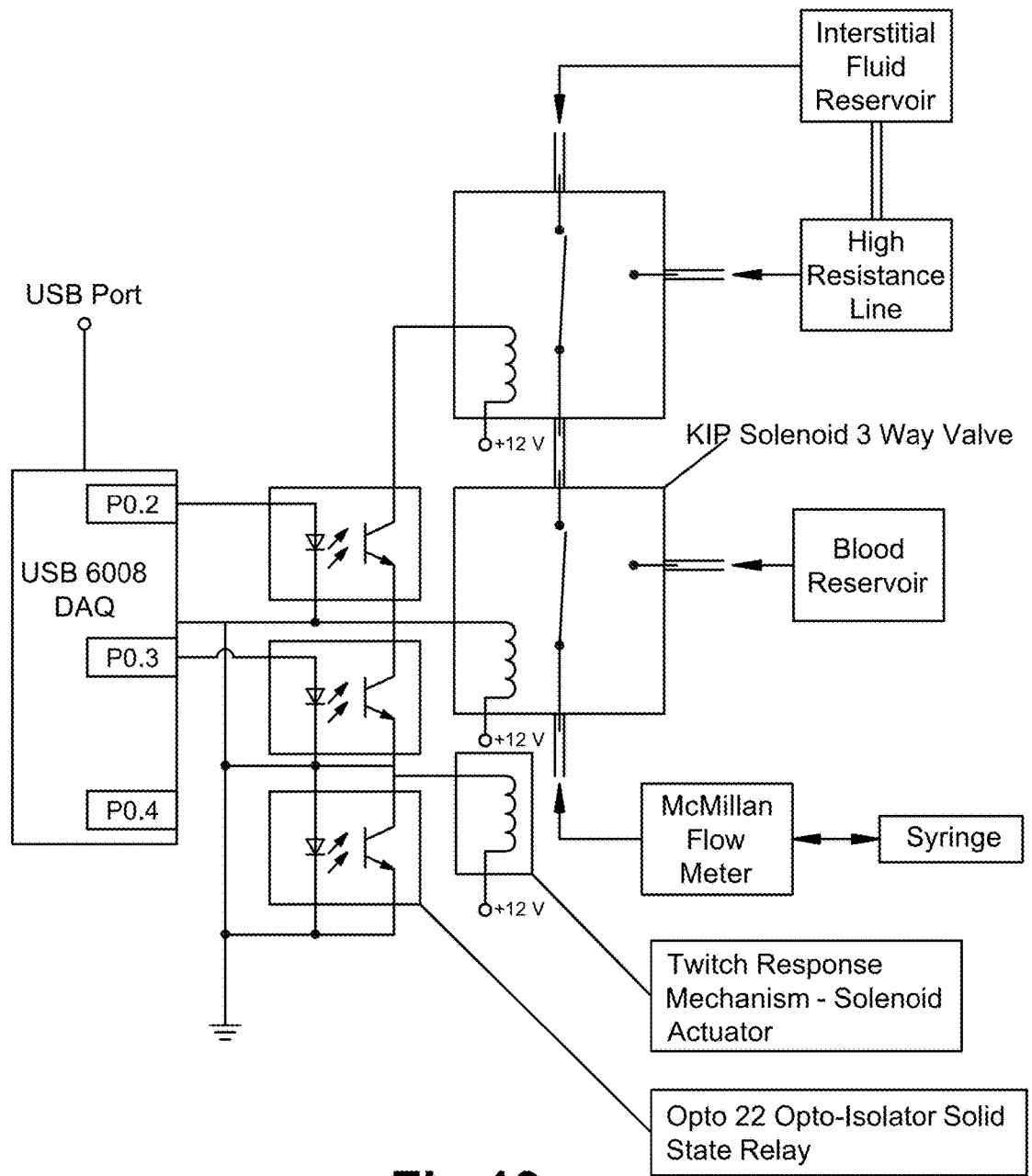
FIG. 13 shows a schematic diagram of an example implementation of a visual/haptic syringe injection system.

FIG. 13 shows a schematic diagram of an example implementation of a visual/haptic syringe injection system. Under real-time computer control, the syringe line can be connected via solenoid valves to: (1) a blood simulant reservoir, (2) a clear (interstitial) fluid reservoir or (3) a high resistance fluid line. This enables the capability to generate various visual and tactile cues at the syringe related to needle tip position. These cues include blood draw-back, clear fluid draw-back, and high or low resistance injection pressure.

Figure 14A:
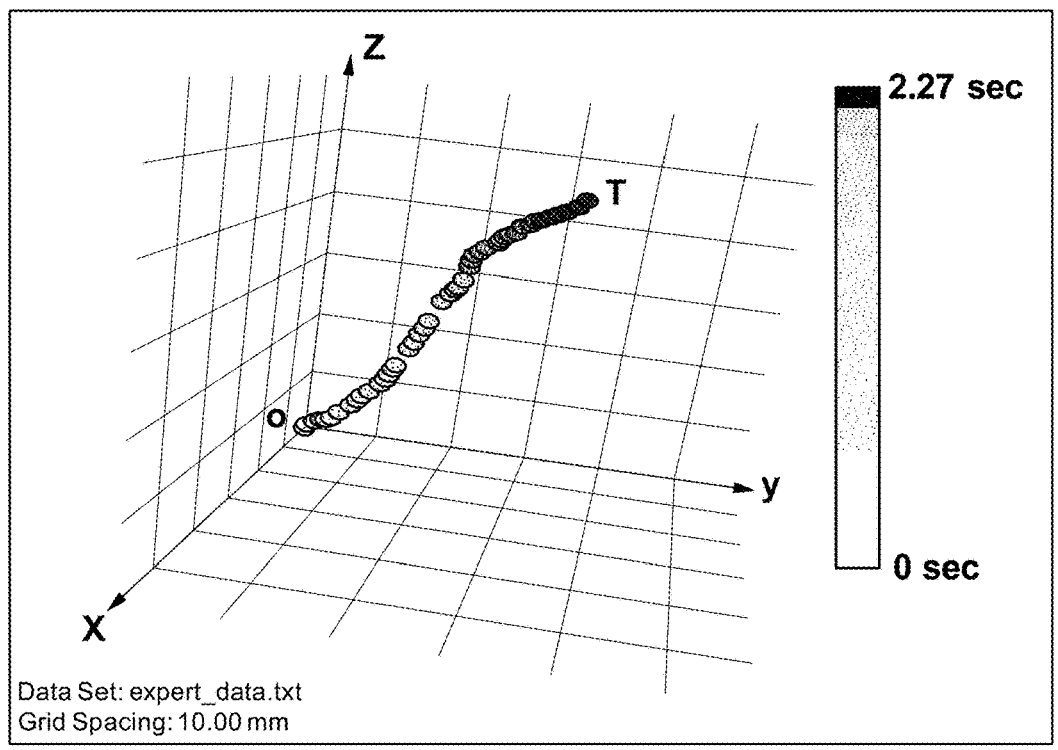
FIGS. 14A and 14B show a pair of 4D graphs of needle tip trajectories recorded with a prototype system in accordance with the subject innovation, as measured with an electromagnetic tracking system.
Figure 14B:
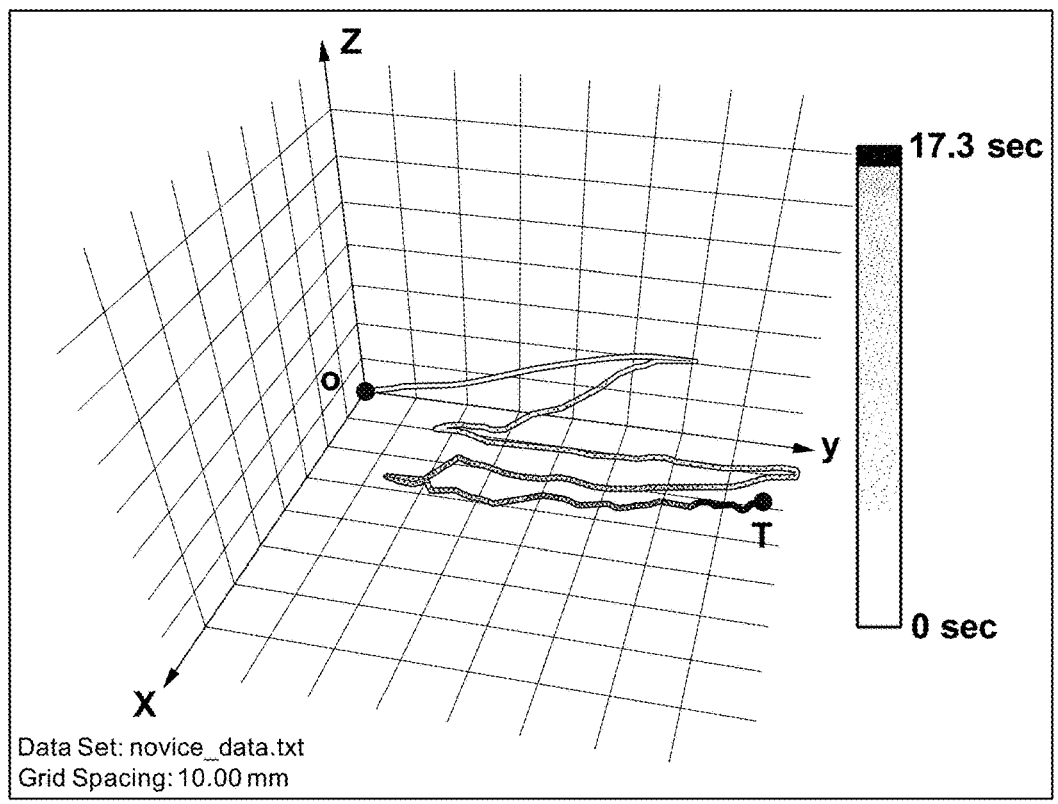

FIGS. 14A and B show a pair of 4D graphs of needle tip trajectories in FIGS. 14A and 14B recorded with a prototype system in accordance with the subject innovation, as measured with an electromagnetic tracking system. The color bars indicate elapsed time along each trajectory. In the graph in FIG. 14A, is an example of a trajectory representative of proficient performance, showing direct, rapid movement from starting point (O, blue) to target (T, red). In graph in FIG. 14B is an example characteristic of novice performance, with multiple back-and-forth attempts, and a greater total time to hit target (17.3 s vs. 2.27 s). FIG. 14A also shows the ability to display position along trajectory as points sampled at constant time intervals (in the graphs shown, the interval was 1/10 second, although greater or lesser intervals can be used). Performance measurements, such as those shown in FIGS. 14A and 14B, can be used to develop standardized, quantitative metrics of performance as described herein. In addition to the information shown in FIGS. 14A and 14B, additional analyses of needle trajectories (or other instrument handling, for example, in other embodiments), which can include calculated metrics of total path length, instantaneous and average velocity and acceleration, sensed injection rate, total injection volume, locations associated with injection volumes, etc. Additionally, multiple trajectories can be compared, for example to determine the deviation of a student's trajectory from one or more designated expert trajectories (or from a region defined by a plurality of expert trajectories), a maximum deviation from one or more expert trajectories (or region), a total deviation (e.g., obtained by integration along the path length, etc.) from one or more expert trajectories (or region), etc. Based on any of the analyses described herein, one or more performance metrics can be utilized to analyze aspects of task performance, which can be used to differentiate novice from expert performance, and can be used for automated scoring and assessment algorithms. Real-time determination of user proficiency can also be incorporated into systems and methods of the subject innovation, to enable intelligent tutoring and learner-adaptive system behavior: for example, more coaching and feedback can be provided to a learner displaying characteristics of novice behavior, or task complexity can be increased to challenge a more proficient user.

The prototype systems described herein had multiple features that can be incorporated into embodiments of the subject innovation.

To construct the isomorphic physical and virtual models, a high-resolution 3D MRI scan was obtained of a subjects arm while encased in a silicone mold and fiberglass support shell. A silicone mold was made of a volunteer's arm while in the flexed, above-head position that occurs during a brachial plexus block. A rigid, two-piece fiberglass-tape support cast was then formed outside the silicone mold to stabilize the arm in place. The subject then donned both the inner silicone cast and outer support cast, was positioned in a 3T MRI machine, and a high-resolution (0.9 mm×0.9 mm×1.8 mm) 3D scan was obtained. The mold was used to create a silicone model of the skin of the arm and axilla. Nerves, blood vessels and other relevant anatomy were segmented from the MRI scan to create a virtual model that was registered with the physical model. Structures were segmented from the acquired MRI data set, molds of these structures were created via stereolithography (although other 3D printing techniques could have been used). The virtual model was also used to fabricate physical models of fascial planes via stereolithography. Polymers were selected to create a physical anatomic model offering realistic resistance to needle insertion based on clinician-validated haptic feedback. These components of the physical model provide the characteristic pop felt during needle passage through the fascia. Similar methods can be used to obtain physical and virtual models of other anatomical regions to develop embodiments simulating procedures in those regions.

A 3D electromagnetic tracking system (Aurora, NDI Inc.) was employed to measure the pose of a standard block needle (with attached miniature 5 degree of freedom (DOF) sensor) and sham ultrasound probe (with a 6 DOF sensor). The spatial tracking of needle tip position can be used as a basis (e.g., partial, full, etc.) for automated proficiency metrics based on tracked needle trajectories, needle targeting accuracy, and measures of intrusion of the needle into undesired anatomy, such as blood vessels or the nerve itself.

The anesthetic syringe simulator was developed as a subsystem consisting of a flow sensor, solenoid valves and fluid reservoirs that enabled the ability to draw back blood simulant if the needle tip was determined to be within a (virtual) blood vessel, indicating the need to reposition the needle prior to injection. Fluid resistance could be controlled during injection and plunger pullback depending on the sensed location of the needle tip with respect to structures in the virtual model such as blood vessels, soft tissue or nerve fascicles. The measurement of injection rate and volume can also be used as a basis additional measures of trainee performance.

Ultrasound (US) images were able to be simulated by tracking the pose of the US probe, specifying an imaging plane through the virtual model and displaying an approximation to an US image via reformatting of 3D model data (e.g., a 3D data set of the internal anatomy).

A set of mechatronic actuators and a cable-drive system were incorporated into the physical arm model to provide visual feedback of muscle twitch to the user when any of the four principal nerves of the brachial plexus were stimulated. This was accomplished via enabling the ability to insert a (real) needle into the limb, tracking its location, computing the distance from the needle tip to a virtual nerve, and eliciting a muscle twitch response when the nerve had been successfully targeted.

Also, the system included the capability for any standard clinical neurostimulator to be used with the system. An electronic interface sensed the electrical output of the neurostimulator. The measured rate and intensity of the current pulses were then combined with needle-to-nerve distance data to compute twitch output quality and intensity. An algorithm compared the stimulator parameters, the identity of the closest nerve and the needle-to-nerve distance to determine if a twitch was produced, and if so, the character, rate and intensity of the twitch. Multiple types of twitch were able to be generated, corresponding to stimulation of the median, ulnar, radial and musculocutaneous nerves. In other embodiments, other twitch responses can be modeled.

Although the prototypes described above related specifically to only one clinical procedure (peripheral nerve blockade), the systems and methods of the subject innovation can be used in connection with numerous other clinical procedures involving manipulating a tool in 3D space.

Figure 15:
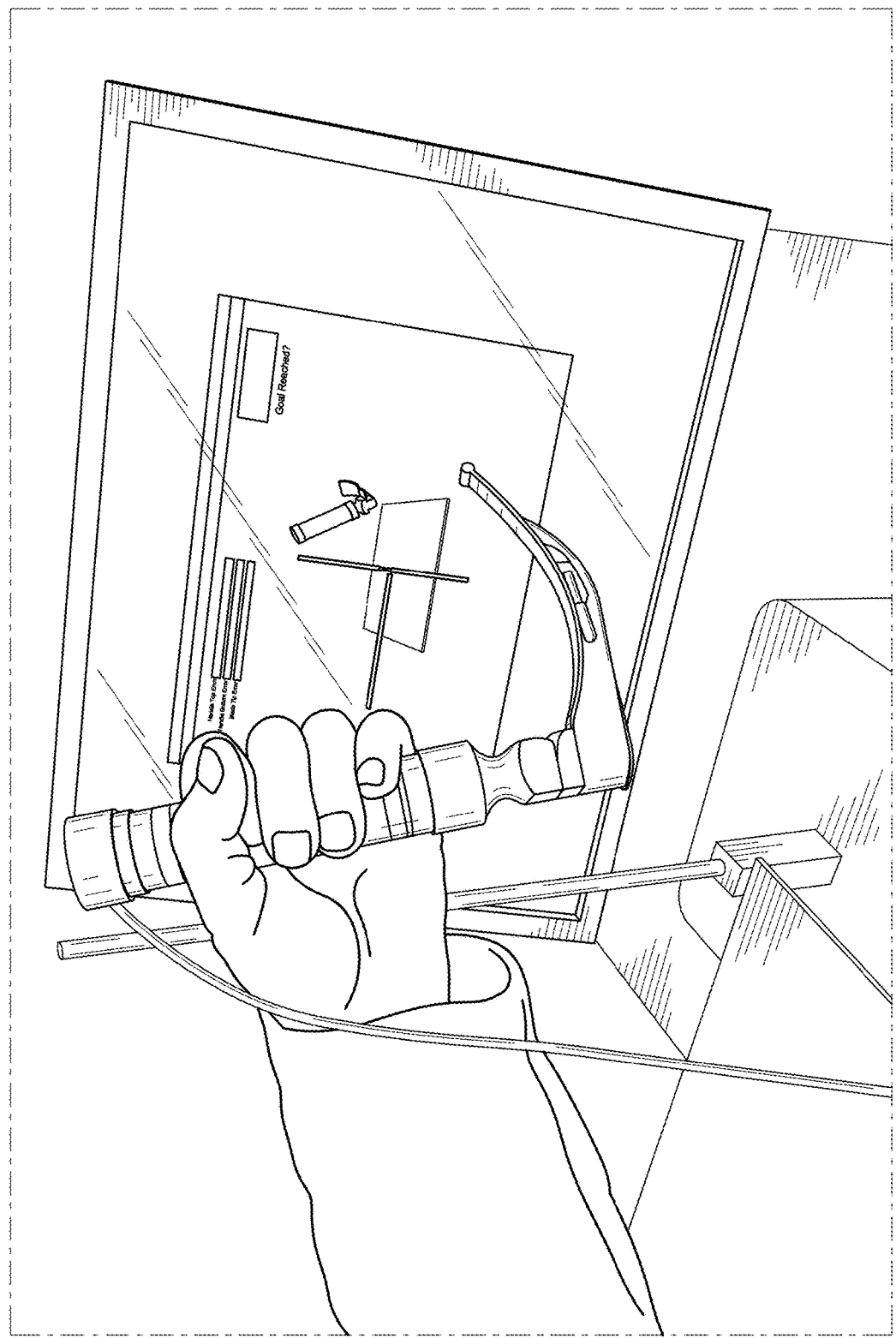
FIG. 15 illustrates an example prototype model simulating insertion of a laryngoscope in accordance with experiments utilizing some features described herein.
Figure 16A:
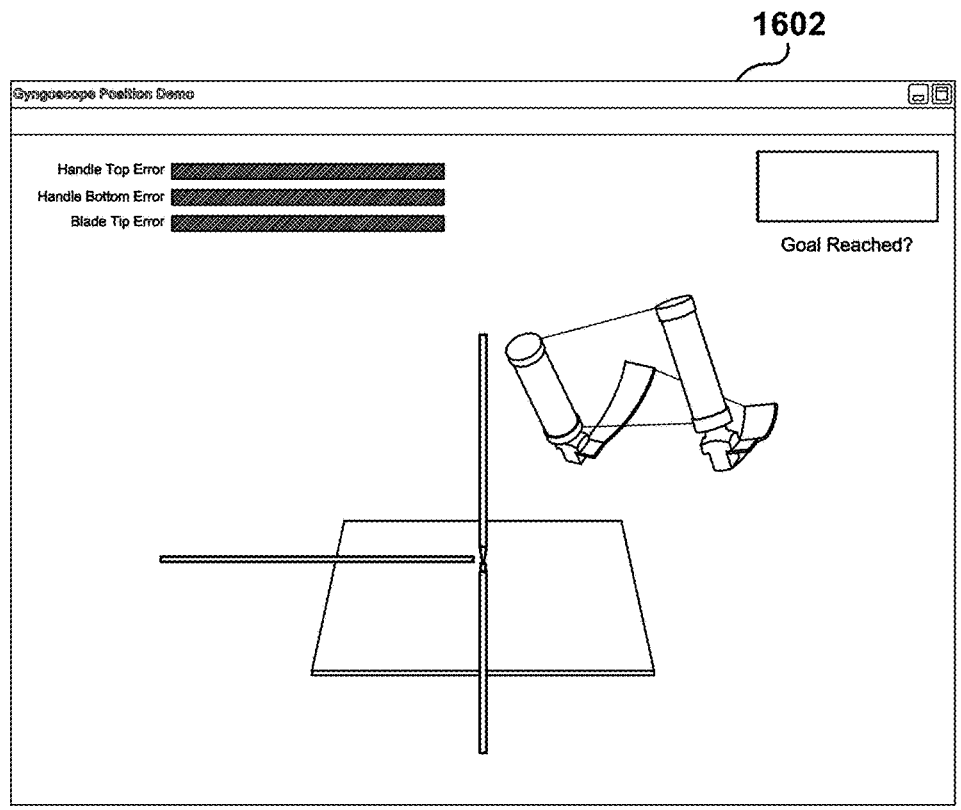
FIGS. 16A and 16B illustrate both the fixed, target laryngoscope position, rendered as a 3D virtual laryngoscope on a computer display, and a current, "live" laryngoscope position.
Figure 16B:
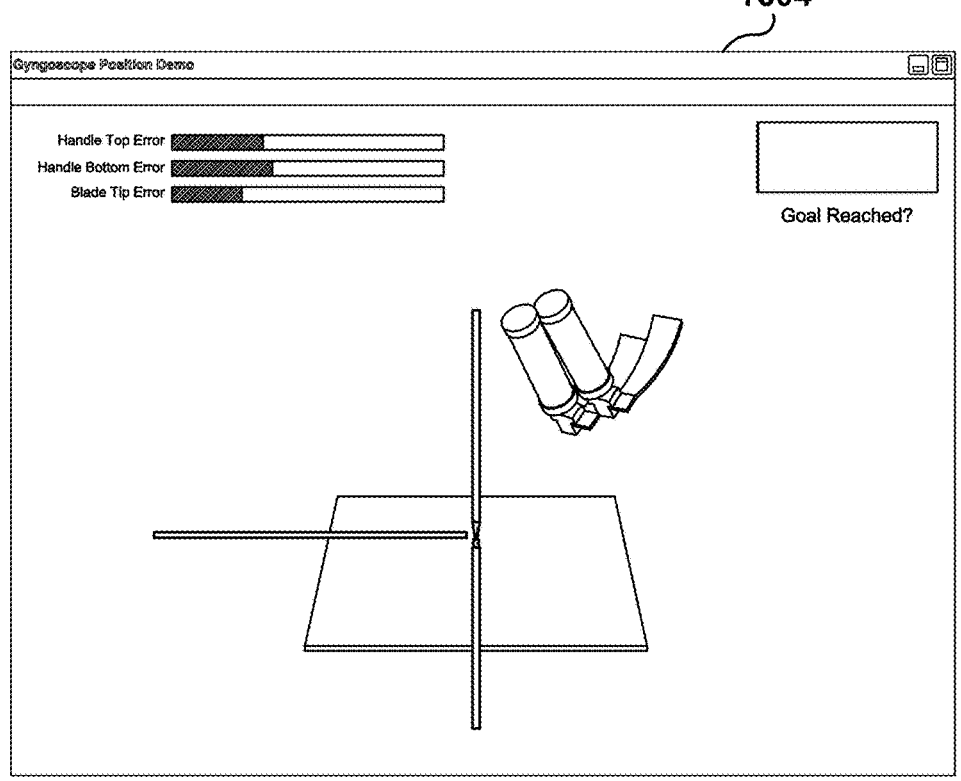

In an experiment utilizing some features discussed above in connection with the peripheral nerve block simulation experiments, FIG. 15 illustrates an example prototype model simulating insertion of a laryngoscope and involving some features discussed herein. This system utilized an ordinary laryngoscope in connection with an electromagnetic tracking system and associated 6 degree-of-freedom sensors to construct a tracking system for a laryngoscope. A laryngoscope was fitted with the tracking sensor attached via a custom-made adapter to the end of the hand, and a 3D model of the laryngoscope was generated, as can be seen in the display in FIG. 15. The system was able to display a "target" position for the laryngoscope—set, for example, by a clinical teacher. As seen in FIGS. 16A and 16B, a learner or user of the system can see both the fixed, target laryngoscope position, rendered as a 3D virtual laryngoscope on a computer display, and a current, "live" laryngoscope position. As the live laryngoscope is aligned to the target position, positional error metrics can be displayed as visual cues (e.g., color coded, etc.) to guide the user. When the positional error drops below a preset threshold, a visual alert and audio tone can signal the user that he or she has successfully targeted the reference position. Although this prototype related specifically to a laryngoscope, this technique can be applied to any tool or device and can permit both quantification of proper manipulation and visual feedback to guide a learner to achieving correct target positioning.

When the desired ("expert") position is achieved, the system can capture and display the reference position as a static gray target (e.g., via a button press or other input, etc.). As seen in the images in 16A and 16B, a "learner" scope was displayed, shown in red, and was tracked and moving in real time. The distance between the target and "live" scope was measured at three locations (blade tip, hinge, and handle end) and displayed as red, green and blue bar graphs. In the image shown in 16B, the live scope had been manipulated close to target pose, and the proximity was displayed as a color change of live scope from red to yellow. When the live and target scopes were aligned within a preset threshold, the live scope would change color to green and a "goal" light would illuminate with concomitant audio feedback.

In aspects of the subject innovation, user performance in various clinical procedures can be measured based on expert performance. The subject innovation (e.g., in connection with measuring user performance) can employ various AI-based schemes for carrying out performance measurements. For example, a process for determining a metric of trainee performance can be facilitated via an automatic classifier system and process. Moreover, various embodiments of the system can maintain a library of stored expert performance (and, potentially, a variety of stored novice performances, etc.) of the clinical procedure establishing a range of expert behavior, and the classifier can be employed to determine user performance according to a plurality of performance metrics.

An example of a classifier system is cluster analysis, in which measured performance parameters are regarded as points in an n-dimensional space, and an analysis is made to determine the degree to which point clusters associated with two cohorts, such as novice and expert users, can be differentiated. Sufficiently differentiated clusters can provide a "signature" of level of proficiency. The measured performance parameters can be metrics such as time to complete task, total path length taken as a needle tip is moved from skin surface to nerve, smoothness of needle path, and accuracy metrics such as the number of times a blood vessel was penetrated during the simulated task, etc. This enables the development of models of the behavior characteristics of experts and novices while using the simulation system. These data also enable a quantitative distance metric to be defined between novice and expert performers. For example, the Euclidean distance between the n-dimensional point of performance parameters for an individual trainee and the centroids of the novice and expert clusters in the n-dimensional space of measured performance parameters can be used as a measure, or score, of the individual trainee's performance. The distance metric enables quantitative assessment of how closely an individual's performance compares to the measured, empirical performance of either novices or experts. This can then enable an objective score of performance to be provided to the trainee, and a quantitative indication to the trainee of what aspects of his or her performance need to be improved to come closer to expert performance. It can also enable data-driven, customized, learner-adaptive feedback via an instructional interface.

In order to provide additional context for various aspects of the subject innovation, the following discussion is intended to provide a brief, general description of a suitable computing environment in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a physical model of an anatomic region associated with a clinical procedure;
   a virtual model of the anatomic region that complements the physical model, wherein the virtual model associates an anatomic structure and a tissue type with the physical model;
   a tracking component that: (i) tracks a location of a clinical instrument relative to the physical model, (ii) maps the location to a corresponding anatomic position in the virtual model, and (iii) determines at least one of a particular anatomic structure and a particular tissue type located at the anatomic position in the virtual model;
   a clinical instrument interface component that detects an output of the clinical instrument wherein the output comprises data associated with an electrical signal, pressure or flow associated with the clinical instrument; and
   a feedback component that: (i) determines an effect that the output of the clinical instrument would have on the virtual model at the anatomic position in the virtual model based on the at least one of the particular anatomic structure and the particular tissue type and the output of the clinical instrument, (ii) generates feedback response information for manipulating a physical characteristic of the physical model based at least in part on the determined effect, (iii) causes the physical characteristic of the physical model to be manipulated based on the determined feedback response information, and (iv) causes the virtual model to be changed according to the effect.

2. The system of claim 1, wherein the manipulating the physical characteristic of the physical model comprises at least one of movement of the physical model, change of shape, change of temperature, change of color, change of material compliance, or changes in other haptic, visual, and auditory properties of the physical model.

3. The system of claim 1, further comprising a component that generates a feedback effect to the at least one clinical instrument.

4. The system of claim 3, wherein the clinical instrument comprises a needle associated with a medical syringe, wherein the feedback effect is based at least in part on the particular anatomic structure and the particular tissue type associated with a location of the needle mapped by the tracking component, and wherein the feedback effect comprises a resistance to a pull-back of a plunger of the syringe or a visual indicator.

5. The system of claim 4, wherein the feedback effect comprises at least one of simulated blood or a clear fluid entering the syringe in response to the pull-back of the plunger.

6. The system of claim 1, wherein the physical model, the virtual model, and the associated tissue type are determined based at least in part on a three-dimensional (3D) medical imaging scan of an anatomic region of a real human body.

7. The system of claim 6, wherein the tissue type is associated based at least in part on a segmentation of the 3D medical imaging scan.

8. The system of claim 6, wherein the physical model is based at least in part on 3D printing of one or more segmented anatomic structures from the 3D medical imaging scan.

9. The system of claim 1, further comprising an instructor interface that displays information associated with the location of the at least one clinical instrument.

10. The system of claim 1, wherein the physical model comprises a plurality of polymers that provide a realistic compliance or mechanical resistance for the anatomic region.

11. The system of claim 1, wherein the tracking component records a trajectory associated with the clinical instrument.

12. A system, comprising:
a physical model of an anatomic region associated with a clinical procedure;
a virtual model of the anatomic region that complements the physical model, wherein the virtual model associates an anatomic structure and a tissue type with the physical model;
a tracking component that: (i) tracks a location of a clinical instrument relative to the physical model, (ii) maps the location to a corresponding anatomic position in the virtual model, and (iii) determines at least one of a particular anatomic structure and a particular tissue type located at the anatomic position in the virtual model;
a clinical instrument interface component that detects an output of the clinical instrument wherein the output comprises data associated with an electrical signal, pressure or flow associated with the clinical instrument; and
a feedback component that: (i) determines an effect that the output of the clinical instrument would have on the virtual model at the anatomic position in the virtual model based on the at least one of the particular anatomic structure and the particular tissue type and the output of the clinical instrument, (ii) generates feedback response information for manipulating a physical characteristic of the physical model based at least in part on the determined effect, (iii) causes the physical characteristic of the physical model to be manipulated based on the determined feedback response information, and (iv) causes the virtual model to be changed according to the effect, wherein the clinical instrument comprises a nerve block needle and a neurostimulator, wherein the tracking component tracks the location of a tip of the needle, wherein the clinical instrument interface receives a signal from the neurostimulator, and wherein the manipulating the physical characteristic of the physical model comprises a simulated muscle twitch response in the physical model based at least in part on the signal from the neurostimulator and the tracked position of the tip of the needle relative to the location of nerves in the virtual model.

13. A system that simulates a nerve block procedure via a hybrid physical-virtual simulation, comprising:
a physical model of an anatomic region, wherein the physical model is based at least in part on a magnetic resonance imaging (MRI) scan of the anatomic region;
a virtual model of the anatomic region isomorphic to the physical model, wherein the virtual model is based at least in part on the MM scan, and wherein a tissue type is associated with each location of the virtual model based at least in part on a determination of the tissue type from segmentation of the MRI scan;
a tracking component that: (i) monitors a location and an orientation of a needle tip of a syringe and a sham ultrasound probe of a clinical instrument relative to the physical model, (ii) maps the location and the orientation to a corresponding anatomic position in the virtual model, and (iii) determines at least one of a particular anatomic structure and a particular tissue type located at the anatomic position in the virtual model;
a clinical instrument interface component that detects an output of the clinical instrument wherein the output comprises data associated with an electrical signal, pressure or flow associated with the clinical instrument;
a mechatronic component that: (i) determines an effect that the output of the clinical instrument would have on the virtual model at the anatomic position in the virtual model based on the at least one of the particular anatomic structure and the particular tissue type and the output of the clinical instrument, (ii) generates feedback response information for manipulating a physical characteristic of the physical model based at least in part on the determined effect, (iii) causes the physical characteristic of the physical model to be manipulated based on the determined feedback response information, and (iv) causes the virtual model to be changed according to the effect, wherein the clinical instrument comprises a nerve block needle and a neurostimulator, wherein the tracking component tracks the location of a tip of the needle, wherein the clinical instrument interface receives a signal from the neurostimulator, and wherein the manipulating the physical characteristic of the physical model comprises a simulated muscle twitch response in the physical model based at least in part on the signal from the neurostimulator and the tracked position of the tip of the needle relative to the location of nerves in the virtual model;
a student application that displays a simulated ultrasound image based at least in part on the location and the orientation of the sham ultrasound probe and the output of the clinical instrument; and
an instructor application that displays the tissue type associated with the location of the needle tip and a distance between the needle tip and a target nerve of the virtual model.

14. The system of claim 13, further comprising a syringe associated with the needle tip, wherein the mechatronic component causes at least one of a colored liquid or a clear liquid to be produced in the syringe.

15. The system of claim 13, wherein the mechatronic component causes at least one of simulated blood or a clear fluid to enter the syringe in response to a pull-back of a plunger of the syringe.

16. The system of claim 13, wherein the physical model and the virtual model are determined based at least in part on a three-dimensional (3D) medical imaging scan of an anatomic region of a real human body.

17. A method for facilitating training in a clinical procedure, comprising:
- generating a physical model of an anatomic region associated with the clinical procedure;
- determining a virtual model of the anatomic region that complements the physical model, wherein the virtual model associates an anatomic structure and a tissue type with the physical model;
- tracking a location of a clinical instrument relative to the physical model, mapping the location to a corresponding anatomic position in the virtual model, and determining at least one of a particular anatomic structure and a particular tissue type located at the anatomic position in the virtual model;
- detecting an output of the clinical instrument wherein the output comprises data associated with an electrical signal, pressure or flow generated by the clinical instrument;
- determining in a feedback component an effect that the output of the clinical instrument would have on the virtual model at the anatomic position in the virtual model based on the at least one of the particular anatomic structure and the particular tissue type and the output of the clinical instrument;
- generating in the feedback component feedback response information for manipulating a physical characteristic of the physical model based at least in part on the determined effect;
- causing the physical characteristic of the physical model to be manipulated based on the determined feedback response information; and
- causing the virtual model to be changed according to the effect.

18. The method of claim 17, further comprising:
- displaying information associated with the location of the at least one clinical instrument.

19. The method of claim 17, further comprising:
- wherein the manipulating the physical characteristic of the physical model comprises at least one of moving the physical anatomic model, changing a shape of the physical anatomic model, changing a temperature of the physical anatomic model, changing a color of the physical anatomic model, changing a material compliance of the physical anatomic model, or changing other haptic, visual, and auditory properties of the physical anatomic model.

20. The method of claim 17, wherein the tracking the location of the clinical instrument further comprises tracking a location of a needle on the tip of the clinical instrument, wherein the needle is a nerve block needle and wherein the clinical instrument further comprises a neurostimulator.

* * * * *